US011709839B2

(12) United States Patent
Idei et al.

(10) Patent No.: US 11,709,839 B2
(45) Date of Patent: Jul. 25, 2023

(54) DATABASE SYSTEM AND QUERY EXECUTION METHOD

(71) Applicants: Hitachi, Ltd., Tokyo (JP); The University of Tokyo, Tokyo (JP)

(72) Inventors: Hideomi Idei, Tokyo (JP); Kazuhiko Mogi, Tokyo (JP); Norifumi Nishikawa, Tokyo (JP); Akira Shimizu, Tokyo (JP); Kazuo Goda, Tokyo (JP); Yuto Hayamizu, Tokyo (JP); Masaru Kitsuregawa, Tokyo (JP)

(73) Assignees: HITACHI, LTD., Tokyo (JP); THE UNIVERSITY OF TOKYO, Tokyo (JP)

( * ) Notice: Subject to any disclaimer, the term of this patent is extended or adjusted under 35 U.S.C. 154(b) by 15 days.

(21) Appl. No.: 17/471,267

(22) Filed: Sep. 10, 2021

(65) Prior Publication Data
US 2022/0129453 A1 Apr. 28, 2022

(30) Foreign Application Priority Data
Oct. 27, 2020 (JP) ................ 2020-179852

(51) Int. Cl.
*G06F 16/2455* (2019.01)
(52) U.S. Cl.
CPC ............. *G06F 16/2455* (2019.01)
(58) Field of Classification Search
CPC .................. G06F 16/2455
USPC ...................... 707/769
See application file for complete search history.

(56) References Cited

U.S. PATENT DOCUMENTS

| 7,177,917 | B2 * | 2/2007 | Giotta ............. G06F 9/546 709/227 |
| 11,080,345 | B2 * | 8/2021 | Pal ............ G06F 16/27 |
| 11,443,390 | B1 * | 9/2022 | Caligaris ............ G06Q 40/125 |
| 2010/0241708 | A1 * | 9/2010 | Zuckerman ........ H04L 67/1046 709/204 |
| 2012/0173541 | A1 * | 7/2012 | Venkataramani ... G06F 12/0844 707/769 |
| 2014/0074876 | A1 * | 3/2014 | Venkataramani ... G06F 16/2255 707/769 |
| 2014/0279920 | A1 * | 9/2014 | Madhavarapu ..... G06F 16/2358 707/649 |

(Continued)

OTHER PUBLICATIONS

Anurag Gupta, et al. Amazon Redshift and the Case for Simpler Data Warehouses, SIGMOD '15: Proceeding of the 2015 ACM SIGMOD International Conference on Management of Data, May 2015, p. 1917-1923.

*Primary Examiner* — Hanh B Thai
(74) *Attorney, Agent, or Firm* — Mattingly & Malur, PC

(57) ABSTRACT

A database system includes a plurality of DBMSs included in a plurality of nodes. Each DBMS is a first or a second DBMS. The first DBMS transfers a search query and does not execute data retrieval, and the second DBMS executes data retrieval. The plurality of nodes configure one or more node groups. Each node group includes a first node and one or more second nodes. In each node group, the first node is a logical computer that provides a first storage area and executes a first DBMS and the second node is a logical computer that provides a second storage area and executes a second DBMS, each node in the node group stores the same database therein, and data retrieval from the database in the node group is executed by one or more second DBMSs in the node group.

13 Claims, 28 Drawing Sheets

(56) References Cited

U.S. PATENT DOCUMENTS

| | | | | |
|---|---|---|---|---|
| 2015/0169650 A1* | 6/2015 | Gajic | ............... | G06F 16/285 |
| | | | | 707/737 |
| 2015/0227606 A1* | 8/2015 | Barton | ............... | G06F 16/2322 |
| | | | | 707/622 |
| 2015/0286748 A1* | 10/2015 | Lilley | ............... | G06F 16/28 |
| | | | | 707/794 |
| 2016/0048633 A1* | 2/2016 | Pham | ............... | G16B 50/10 |
| | | | | 707/769 |
| 2018/0260190 A1* | 9/2018 | Su | ............... | G06F 16/245 |
| 2019/0095488 A1* | 3/2019 | Bhattacharjee | ............... | G06F 16/951 |
| 2019/0147084 A1* | 5/2019 | Pal | ............... | G06F 16/25 |
| | | | | 707/769 |
| 2019/0163821 A1* | 5/2019 | Pal | ............... | G06F 16/27 |
| 2019/0163823 A1* | 5/2019 | Bhattacharjee | ............... | G06F 16/951 |
| 2019/0171677 A1* | 6/2019 | Pal | ............... | G06F 16/252 |
| 2019/0171678 A1* | 6/2019 | Pal | ............... | G06F 16/2471 |
| 2019/0258632 A1* | 8/2019 | Pal | ............... | G06F 16/2455 |
| 2019/0272271 A1* | 9/2019 | Bhattacharjee | ............... | G06F 16/2471 |
| 2019/0310977 A1* | 10/2019 | Pal | ............... | G06F 16/2455 |

\* cited by examiner

FIG. 4A

```
┌─────────────────────────────────────────┐
│        DB AREA INFORMATION        ~400  │
│                                         │
│         SCHEMA INFORMATION        ~402  │
│                                         │
│    TABLE CONFIGURATION INFORMATION ~404 │
└─────────────────────────────────────────┘
```

DB MANAGEMENT INFORMATION 226

FIG. 4B

| DB AREA ID (410) | DEVICE FILE PATH (412) | UNUSED AREA (414) |
|---|---|---|
| SYS_DIC | /dev/sdc1 | 512MB |
| DB00 | /dev/sdd1 | 16GB |
| DB01 | /dev/sde1 | 8GB |
| : | : | : |

DB AREA INFORMATION 400

FIG. 4C

| SCHEMA ID (420) | SCHEMA TYPE (422) | DB AREA ID OF STORAGE DESTINATION (424) |
|---|---|---|
| T1 | Table | DB00 |
| I1 | Index | DB01 |
| : | : | : |

SCHEMA INFORMATION 402

FIG. 4D

| SCHEMA ID 430 | COLUMN ID 432 | COLUMN NAME 434 | DATA TYPE 436 |
|---|---|---|---|
| T1 | Col00 | DATE | Date |
| T1 | Col01 | REGION | Char |
| T1 | Col02 | NAME | Char |
| T1 | Col03 | AGE | Integer |
| : | : | : | : |

TABLE CONFIGURATION INFORMATION 404

NODE MANAGEMENT INFORMATION 228

| NODE ID | NODE TYPE | ID OF MASTER NODE TO WHICH NODE BELONGS | IP ADDRESS | DATA CAPACITY | DATA USAGE AMOUNT |
|---|---|---|---|---|---|
| M1 | Master | — | 192.168.16.10 | 30TB | 30TB |
| C11 | Cache | M1 | 192.168.16.100 | 30TB | 30TB |
| C12 | Cache | M1 | 192.168.16.101 | 30TB | 30TB |
| M2 | Master | — | 192.168.16.11 | 30TB | 30TB |
| C21 | Cache | M2 | 192.168.16.111 | 30TB | 30TB |
| C22 | Cache | M2 | 192.168.16.112 | 30TB | 30TB |
| C23 | Cache | M2 | 192.168.16.113 | 30TB | 30TB |
| ⋮ | ⋮ | ⋮ | ⋮ | ⋮ | ⋮ |

NODE INFORMATION 500

CURRENT MASTER NODE INFORMATION 502

NODE RULE INFORMATION 504

INSTANCE CONFIGURATION INFORMATION 506

FIG. 6A

| NODE ID | TABLE ID | COLUMN ID | START | END |
|---|---|---|---|---|
| M1 | T1 | Col00 | 2017/1/1 | 2017/12/31 |
| M2 | T1 | Col00 | 2018/1/1 | 2018/12/31 |
| : | : | : | : | : |

DATA MANAGEMENT INFORMATION 230

FIG. 6B

| NODE ID | STATE | CPU USAGE RATE [%] | IOPS | THROUGHPUT [MB/sec] |
|---|---|---|---|---|
| C11 | USING | 5 | 1000 | 4 |
| C12 | DELETING | - | - | - |
| : | : | : | : | : |

232A

| NODE ID | STATE | CPU USAGE RATE [%] | IOPS | THROUGHPUT [MB/sec] |
|---|---|---|---|---|
| C21 | USING | 26 | 50000 | 320 |
| C22 | USING | 48 | 200000 | 800 |
| C23 | USING | 75 | 400000 | 1600 |
| : | | : | : | : |

232B

CACHE NODE MANAGEMENT INFORMATION

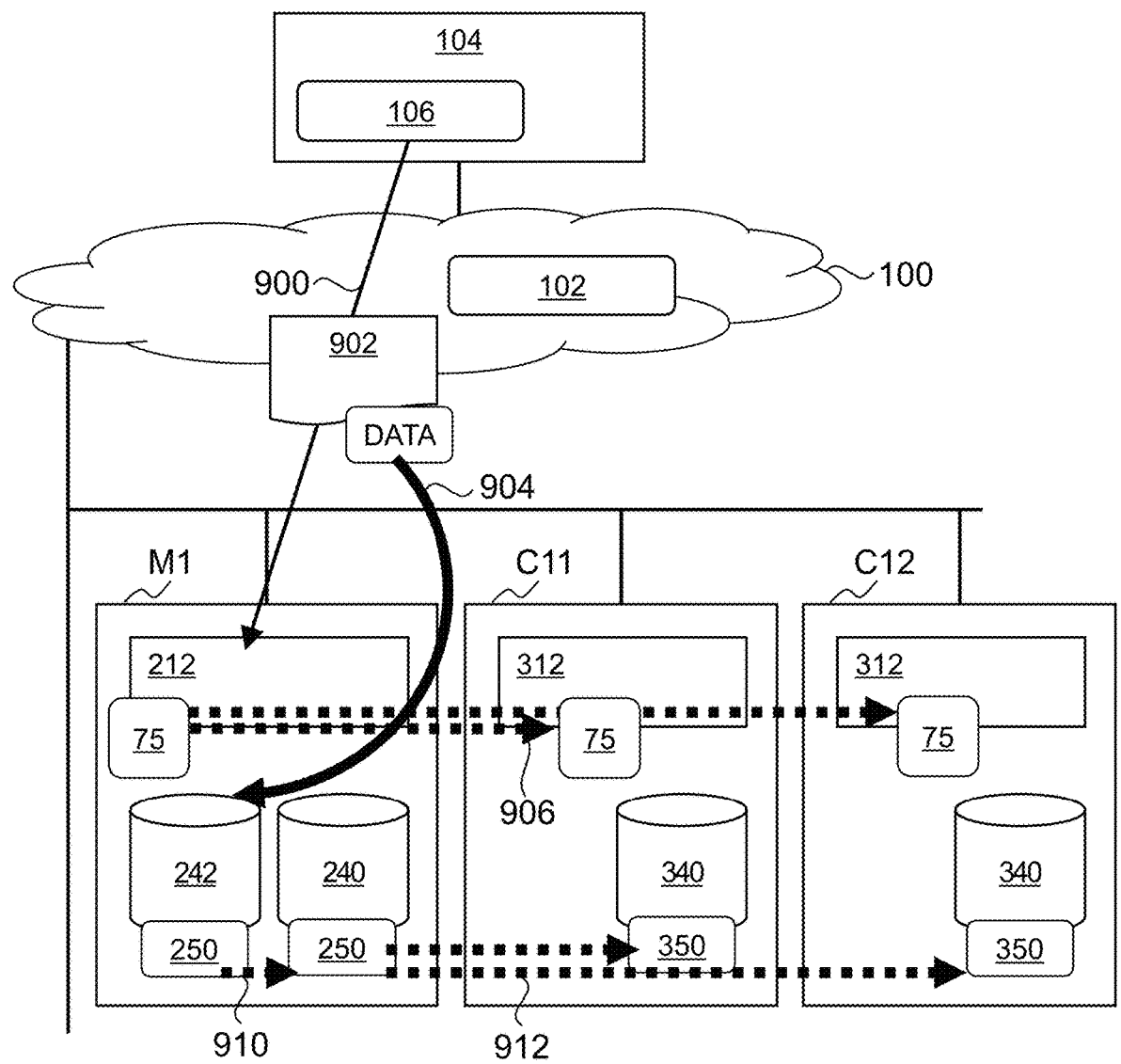

DATABASE SYSTEM AND QUERY EXECUTION METHOD

CROSS-REFERENCE TO PRIOR APPLICATION

This application relates to and claims the benefit of priority from Japanese Patent Application number 2020-179852, filed on Oct. 27, 2020 the entire disclosure of which is incorporated herein by reference.

BACKGROUND

The present invention generally relates to data processing, for example, execution of a search query in a database system built on a cloud.

In recent years, there have been many applications based on databases, and data stored in the databases tends to increase year by year. Hitherto, as software that manages the databases as above, there has been a database management system (hereinafter referred to as a DBMS). When the scale of data managed by the DBMS is enlarged, a storage apparatus that stores the data therein also needs a larger storage capacity, and a larger CPU power is needed in order to speedily perform data retrieval from a large-scale database. The workload and the cost for building and operating a large-scale database system as above on one's own become huge.

Meanwhile, in a cloud environment in which a server and a storage can be easily added, building and operation of a database system in accordance with the business scale, the data scale, or the usage frequency of a user become possible, and the workload and the cost for introducing a system can be reduced because there is no need to prepare a hardware resource on one's own. By using a service of a public cloud such as Amazon Web Services (AWS) (Registered Trademark), the workload and the cost necessary for the maintenance of hardware can also be reduced.

It is possible to build the database system on an instance that is a logical computer by generating the instance on the cloud. When the database system is built, the increase in the data amount and the load increase can be responded to by adding a CPU core, the memory size, and the storage capacity. However, there is a limit to the I/O bandwidth in one instance. Therefore, it becomes difficult to maintain the I/O performance of the database system when the scale of the database system exceeds a certain scale.

Thus, a technology of improving the performance by generating a plurality of instances on a cloud and causing those instances to operate in cooperation with each other has been proposed. For example, Non Patent Literature 1 discloses a technology in which a leader node accepts a query from a client application, a plurality of compute nodes execute processing of the query, and the leader node aggregates the execution results and responds to the client application. Patent Literature 1 discloses a technology that selects a node that executes a request from a client out of a plurality of nodes that operate on a cloud.

Patent Literature 1: US 2015/0169650

Non Patent Literature 1: SIGMOD '15: Proceedings of the 2015 ACM SIGMOD International Conference on Management of Data, May 2015, Pages 1917-1923

SUMMARY

However, in the technology disclosed in Non Patent Literature 1, there is one leader node, and the leader node performs the acceptance of the query, the aggregation of the query execution results, and the response of the query result. Thus, there is a fear that the processing may become overconcentrated. In addition, the technology disclosed in Patent Literature 1 cannot respond to a case where data is arranged in a distributed manner.

The problems above may also occur in a data processing system other than the database system.

In order to solve the above-mentioned problems, a database system as one example of the present invention includes a plurality of DBMSs included in a plurality of nodes provided in one example of a computer system including a plurality of computational resources. Each of the plurality of DBMSs is either a first DBMS or a second DBMS. The first DBMS is a DBMS that transmits, when the first DBMS accepts a search query from a query source, the search query, and does not execute data retrieval. The second DBMS is a DBMS that executes data retrieval. The plurality of nodes configure one or a plurality of node groups. Each of the one or the plurality of node groups includes a first node and one or more second nodes. In each node group, the first node is a logical computer that provides a first storage area and executes the first DBMS, the second node is a logical computer that provides a second storage area and executes the second DBMS, two or more DBMSs included in two or more of the nodes configuring the node group store a same database in two or more storage areas provided by the two or more nodes, and data retrieval from the database in the node group is executed by one or more of the second DBMSs in the node group.

According to the present invention, the overconcentration of the processing can be avoided, and the data retrieval from the data arranged in a distributed manner can be performed.

BRIEF DESCRIPTION OF THE DRAWINGS

FIG. 4A is a diagram showing a configuration example of DB management information;

FIG. 4B is a diagram showing a configuration example of DB area information;

FIG. 4C is a diagram showing a configuration example of schema information;

FIG. 4D is a diagram showing a configuration example of table configuration information;

FIG. 6A is a diagram showing a configuration example of data management information;

FIG. 6B is a diagram showing a configuration example of cache node management information;

FIG. 9 is a diagram showing a processing example of data import that does not involve the addition of a new group;

DESCRIPTION OF EMBODIMENTS

Figure 1:
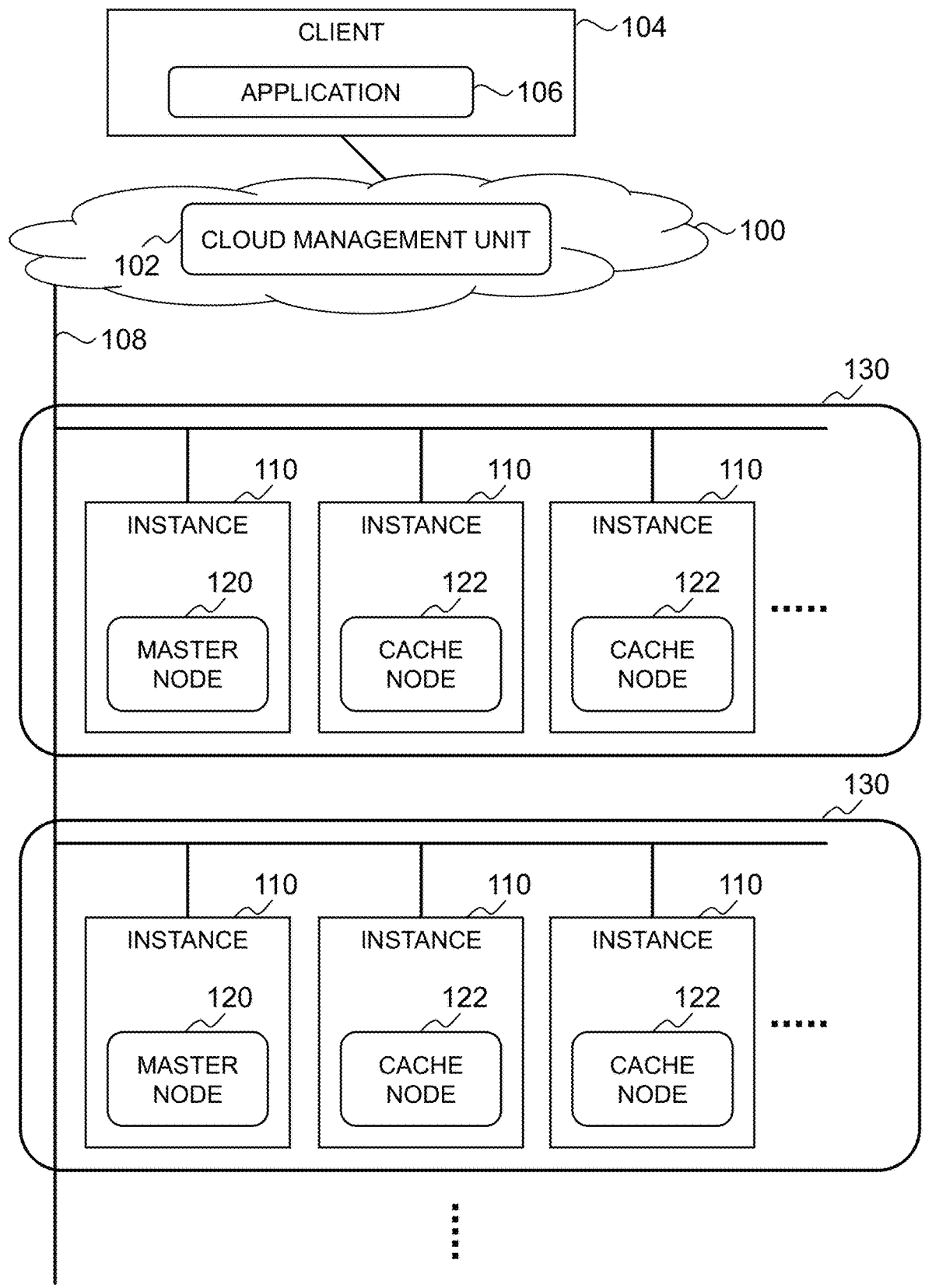
FIG. 1 is a diagram showing a configuration example of a database system in an embodiment of the present invention.

In the description below, a database may be referred to as a "DB", and a database management system may be referred to as a "DBMS". An issuing source of the query for the DBMS may be an external computer program (for example, an application program) of the DBMS.

In the description below, an "interface apparatus" may be one or more interface devices. The one or more interface devices may be one or more same types of communication interface devices (for example, one or more network interface cards (NICs)) or may be two or more different types of communication interface devices (for example, an NIC and a host bus adapter (HBA)).

In the description below, a "memory" is one or more memory devices, and may typically be a main storage device. At least one memory device in the memory may be a volatile memory device or may be a nonvolatile memory device.

In the description below, a "persistent storage apparatus" is one or more persistent storage devices. The persistent storage device is typically a nonvolatile storage device (for example, an auxiliary storage device), and is specifically a hard disk drive (HDD) or a solid state drive (SSD), for example.

In the description below, a "storage apparatus" may be at least the memory out of the memory and the persistent storage apparatus.

In the description below, a "processor" is one or more processor devices. At least one processor device is typically a microprocessor device such as a central processing unit (CPU), but may be other types of processor devices such as a graphics processing unit (GPU). At least one processor device may be a single core or multi core. At least one processor device may be a processor core. At least one processor device may be a processor device in a broad sense such as a hardware circuit (for example, a field-programmable gate array (FPGA) or an application specific integrated circuit (ASIC)) that performs some or all pieces of processing.

In the description below, a function may be described with the expression of a "yyy unit", but the function may be realized by executing one or more computer programs by a processor or may be realized by one or more hardware circuits (for example, the FPGA or the ASIC). When a function is realized by executing a program by a processor, determined processing is performed with use of a storage apparatus, an interface apparatus, and/or other similar apparatuses, as appropriate, and hence the function may be at least one part of the processor. Processing described with use of a function as the subject may be processing performed by a processor or an apparatus including the processor. The program may be installed from a program source. The program source may be a program distribution computer or a recording medium (for example, a non-temporary recording medium) readable by a computer, for example. The description of each function is one example, and a plurality of functions may be grouped together into one function, or one function may be divided into a plurality of functions.

In the description below, common portions out of reference characters (or the reference characters) may be used when the same types of elements are described without distinction, and reference characters (or IDs of the elements) may be used when the same types of elements are distinguished from each other.

Embodiments of the present invention are described in detail below.

(1) Configuration of Database System in Embodiment of Present Invention

FIG. 1 is a diagram showing a configuration example of a database system in an embodiment of the present invention.

A plurality of instances 110 generated on a cloud 100 (one example of a virtual environment based on a computer system including a plurality of computational resources) exist as a plurality of nodes. A plurality of DBMSs (database management systems) are included in the plurality of nodes. A database system is configured by the plurality of DBMSs. Each instance 110 is a logical computer generated on the basis of a physical resource such as a server, a storage, and a network that configure the computer system on which the cloud 100 is based. Each instance 110 is coupled to a logical network 108.

The instance 110 operates as either a master node 120 or a cache node 122. In other words, the instance 110 given the role as a master node may be the master node 120, and the instance 110 given the role as a cache node may be the cache node 122.

A node group (hereinafter a group) 130 is configured by one master node 120 and a plurality of (or one of) cache nodes 122. Each cache node 122 holds data that is completely the same as data of a database held by the master node 120 of the same group (own group) 130 by a method of receiving a copy (replication) of all or one part (for example, a difference) of the database held by the master node 120, for example. Therefore, every cache node 122 can execute data retrieval. However, the master node 120 executes processing relating to update such as data addition. In other words, in this embodiment, writing (for example, data addition) of data onto the database is executed by the master node 120 and is not executed by the cache node 122. Meanwhile, reading (for example, data retrieval) of data from the database is not executed by the master node 120 and is executed by the cache node 122. As a result, realization of a database system with a high read performance can be expected. The master node 120 is one example of a first node, and the cache node 122 is one example of a second node.

Two groups 130 are exemplified in FIG. 1, but the number of the groups 130 may be one or may be three or more. The number of the groups 130 and the number of the master nodes 120 are the same. Out of the above, one master node becomes a current master node. The current master node 120 accepts a processing request (query) from an application 106 (one example of a query source) on a client 104 coupled to the cloud 100. The current master node 120 that has accepted the query transfers the query to the cache node 122 in the same group 130 (assigns processing of query execution). The cache node 122 that has received the query executes the received query, and gives a response of an execution result thereof to the application 106 of the client 104 that is a query issuing source. The cache node 122 may transmit the execution result of the query to the master node 120 that has accepted the query, and the master node 120 may give a response of the execution result to the application 106 of the client 104 that is the query issuing source.

As a method of generating or deleting the instance 110 on the cloud 100, a cloud system manager or a database system manager may manually instruct a cloud management unit 102 to generate or delete the instance 110, or the instance 110 may be automatically generated or deleted by the cloud management unit 102 as a result of the DBMS (or another program) that operates in the database system instructing the cloud management unit 102 to generate or delete the instance 110. In this embodiment, the instance 110 is automatically generated or deleted as a result of the DBMS giving an instruction to the cloud management unit 102. When the instance 110 is generated, the instance 110 having a configuration that is determined by the database manager in advance (for example, a configuration in which the number of CPU cores, the memory size, the storage capacity, and the like are set in advance) is generated. After the generation of the instance, the installation and the environment setting of an operating system (OS) and the installation and the environment setting of the DBMS need to be performed. However, after the instance 110 is newly generated, the generated instance 110 automatically becomes useable by execution of a script, for example, in this embodiment. The cloud management unit 102 is a function that manages the cloud 100. For example, as described above, the instance 110 can be generated on the cloud 100 or the instance 110 can be deleted from the cloud 100.

The trigger for the generation or the deletion of the instance 110 differs depending on whether the instance 110 is the master node 120 or the cache node 122. The trigger for generating the master node 120 is when a database system is newly built or when there are no more areas in which the data of the database can be stored in the existing master node 120. The trigger for deleting the master node 120 is not necessarily needed. However, the master node 120 may be deleted when the database manager determines that the data stored in the master node 120 is unnecessary. In that case, the entire group 130 to which the master node 120 belongs is deleted. The trigger for generating the cache node 122 is when the master node 120 is generated (for example, the cache node 122 of the group 130 to which the master node 120 belongs is generated) or when a load of at least one cache node 122 of one certain group 130 (for example, an average load of all of the cache nodes 122 belonging to the group) exceeds a first threshold value set in advance (for example, the cache node 122 is newly generated in the group 130). The trigger for deleting the cache node 122 is when a load of at least one cache node 122 of one certain group 130 falls below a second threshold value (for example, the second threshold value is a threshold value equal to or smaller than the first threshold value) set in advance or when the master node 120 is deleted (in this case, the group 130 including the master node 120 is deleted).

Figure 2:
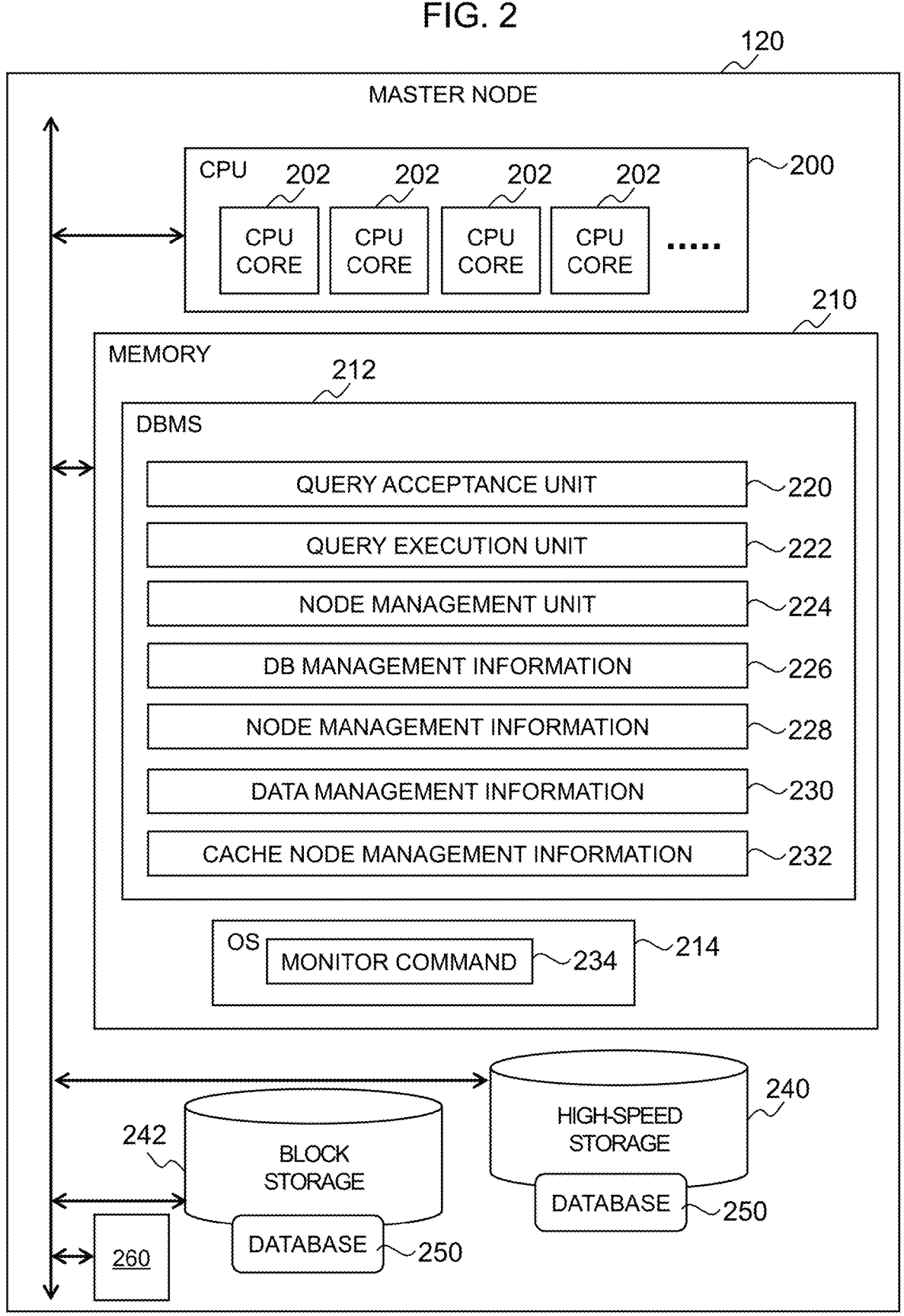
FIG. 2 is a diagram showing a configuration example of a master node.

FIG. 2 is a diagram showing a configuration example of the master node 120.

The master node 120 is configured by an interface apparatus 260, a CPU 200, a memory 210, a block storage 242, and a high-speed storage 240 allocated to the instance 110 in which the master node 120 operates. The CPU 200 is coupled to the interface apparatus 260, the memory 210, the block storage 242, and the high-speed storage 240. Transmission and reception between the nodes are possible through the interface apparatus 260. Each of the interface apparatus 260, the CPU 200, the memory 210, the block storage 242, and the high-speed storage 240 may be a logical computational resource based on a physical computational resource included in the computer system on which the cloud 100 is based, but is a physical computational resource in this embodiment for ease of description.

The CPU 200 is a processor that includes one or a plurality of CPU cores 202 and executes various types of programs such as a DBMS 212 and an OS 214 stored in the memory 210. The memory 210 is a semiconductor memory, for example, and is also used as a work memory of the CPU 200. Entities of the DBMS 212 and the OS 214 may be stored in a disk apparatus such as a hard disk drive (HDD).

The block storage 242 is a disk apparatus such as a small computer system interface (SCSI) disk or a serial AT attachment (SATA) disk, and is a device that has a low access performance, but holds stored data even when power is cut off. The block storage 242 is one example of a first storage area.

The high-speed storage 240 is a nonvolatile memory coupled to a non-volatile memory (NVMe), for example, and is a device in which stored data disappears when power is cut off though the access performance is higher than the block storage 242.

The master node 120 secures the data persistency of the database, and hence includes the block storage 242, but does not necessarily need to include the high-speed storage 240. When the master node 120 includes the high-speed storage 240, the same databases in all of the cache nodes 122 in the same group 130 are expected to be copied at a high speed as follows, for example. In other words, the DBMS 212 copies all or one part of database 250 (for example, a difference between the database 250 in the block storage 242 and the database 250 in the high-speed storage 240) to the high-speed storage 240 from the block storage 242 (so-called internal copy). Then, the DBMS 212 copies all or one part of the database 250 (for example, a difference between the database 250 in the high-speed storage 240 and a database 350 in a high-speed storage 340 described below) to the high-speed storage 340 from the high-speed storage 240 (so-called remote copy). The speed of the internal copy is expected to be high, and the speed of the remote copy is also expected to be high because the remote copy is performed between the high-speed storages 240 and 340.

The DBMS 212 is one example of a first DBMS. The DBMS 212 is a program that manages the data of the database 250 stored in the block storage 242 and the high-speed storage 240. The DBMS 212 includes a query acceptance unit 220, a query execution unit 222, a node management unit 224, DB management information 226, node management information 228, data management information 230, and cache node management information 232 in order to manage the database and execute the query accepted from the client. The OS 214 is a general OS such as Linux (R) and, although description is omitted here, includes a monitor command 234 such as sar/mpstat/iostat that monitors the operating state of the CPU and I/O.

Figure 3:
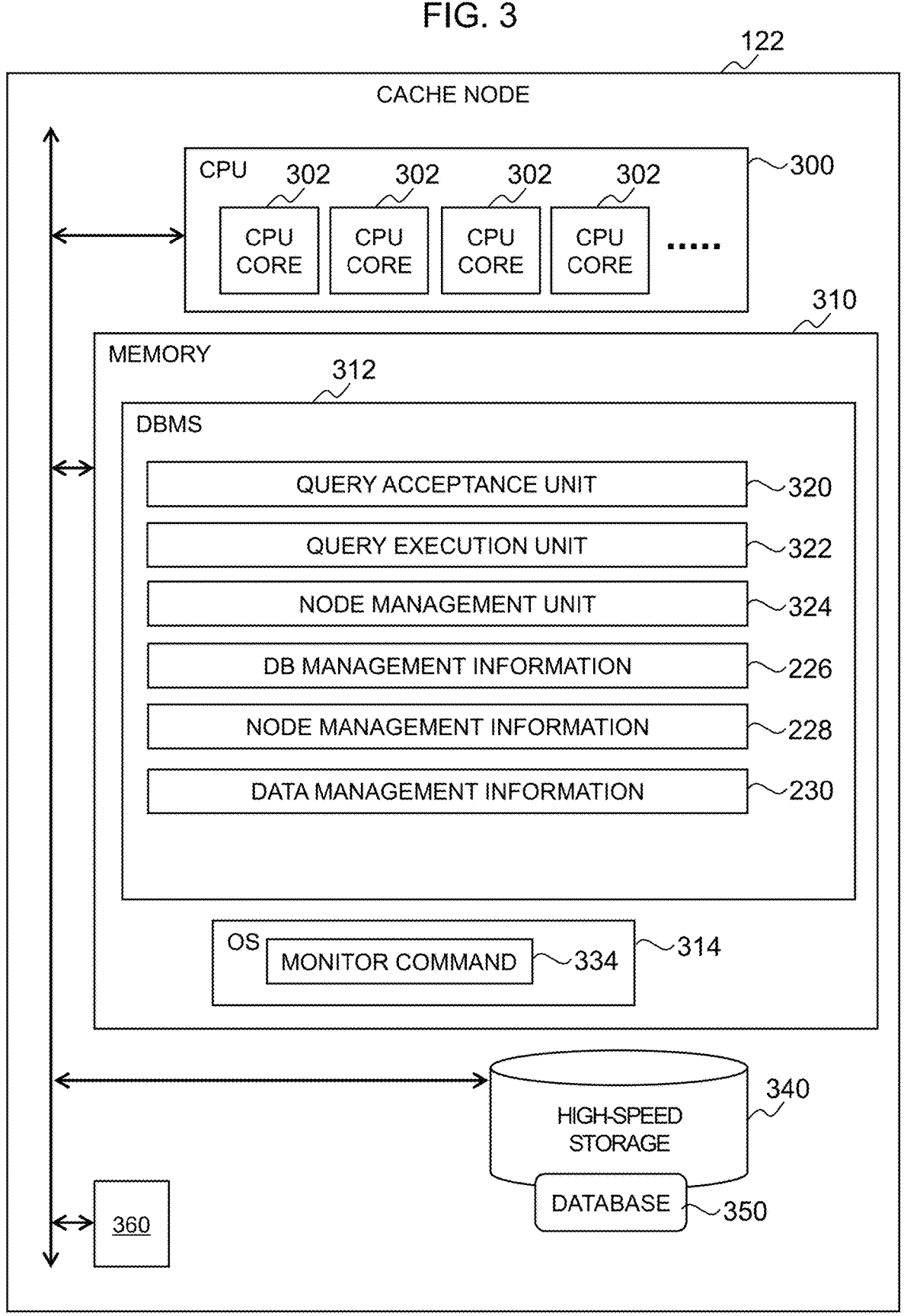
FIG. 3 is a diagram showing a configuration example of a cache node.

FIG. 3 is a diagram showing a configuration example of the cache node 122.

The cache node 122 has a basic configuration that is not different from that of the master node 120 described above, and is configured by an interface apparatus 360, a CPU 300, a memory 310, and the high-speed storage 340 allocated to the instance in which the cache node 122 operates. The CPU 300 is coupled to the interface apparatus 360, the memory 310, and the high-speed storage 340. Transmission and reception between the nodes are possible through the interface apparatus 360. Each of the interface apparatus 360, the CPU 300, the memory 310, and the high-speed storage 340 may also be a logical computational resource based on a physical computational resource included in the computer system on which the cloud 100 is based, but is a physical computational resource in this embodiment for ease of description.

The cache node 122 holds the database 350 in the high-speed storage 340 but does not have a block storage for storing the database 350 therein. The cache node 122 reads data from the database 350 of the high-speed storage 340. The high-speed storage 340 is a nonvolatile memory coupled to a non-volatile memory (NVMe), for example, and is a device in which stored data disappears when power is cut off though the access performance is higher than that of the block storage 242. The high-speed storage 340 is one example of a second storage area. In the second storage area, data may disappear in accordance with power cut-off or the persistency of the data may be secured as long as the speed of the block storage 242 is higher than that of the first storage area that is one example.

The CPU 300 is a processor that includes one or a plurality of CPU cores 302 and executes various types of programs such as a DBMS 312 and an OS 314 stored in the memory 310. The memory 310 is a semiconductor memory, for example, and is also used as a work memory of the CPU 300. Entities of the DBMS 312 and the OS 314 may be stored in a disk apparatus such as a hard disk drive (HDD).

The DBMS 312 is one example of a second DBMS. The DBMS 312 is a program that manages the data of the database 350 stored in the high-speed storage 340. The DBMS 312 includes a query acceptance unit 320, a query execution unit 322, a node management unit 324, the DB management information 226, the node management information 228, and the data management information 230 in order to manage the database and execute the query accepted from the client. The OS 314 is a general OS such as Linux, and includes a monitor command 334 such as sar/mpstat/iostat that monitors the operating state of the CPU and I/O.

FIG. 4A is a diagram showing a configuration example of the DB management information 226.

The DB management information 226 is configured by DB area information 400 relating to the area in which the data of the database is stored, schema information 402 relating to a schema such as a table and an index of the database, and table configuration information 404 relating to the configuration of the table of the database.

FIG. 4B is a diagram showing a configuration example of the DB area information 400.

The DB area information 400 is information that correlates a DB area that is a logical area that stores the data of the database therein and a block storage that actually stores the data therein or a device file on the OS that corresponds to a logical unit (LU) of the high-speed storage, and has an entry for each DB area. Each entry has a field 410 in which an ID that uniquely identifies a DB area is registered, a field 412 in which a device file path corresponding to the DB area is registered, and a field 414 in which the size of an unused area of the DB area is registered. Although description is omitted here, the LU is a storage area on a storage recognized by the OS, and the OS maps the storage area and the device file to each other. Each of the block storage and the high-speed storage may correspond to one LU. In this case, the LU serving as the block storage may be one example of the first storage area, and the LU serving as the high-speed storage may be one example of the second storage area.

FIG. 4C is a diagram showing a configuration example of the schema information 402.

The schema information 402 is information relating to schemata such as the table and the index of the database, and has an entry for each schema of the database. Each entry has a field 420 in which an ID that uniquely identifies a schema is registered, a field 422 in which the type of the schema is registered, and a field 424 in which an ID of the DB area that stores data of the schema therein is registered.

FIG. 4D is a diagram showing a configuration example of the table configuration information 404.

The table configuration information 404 is information relating to a table configuration of the database, and has an entry for each column that configures the table. Each entry has a field 430 in which an ID that uniquely identifies a table is registered, a field 432 in which an ID that uniquely identifies a column that configures the table is registered, a field 434 in which the name of the column is registered, and a field 436 in which the data type of the column is registered.

Figures 5A, 5B:
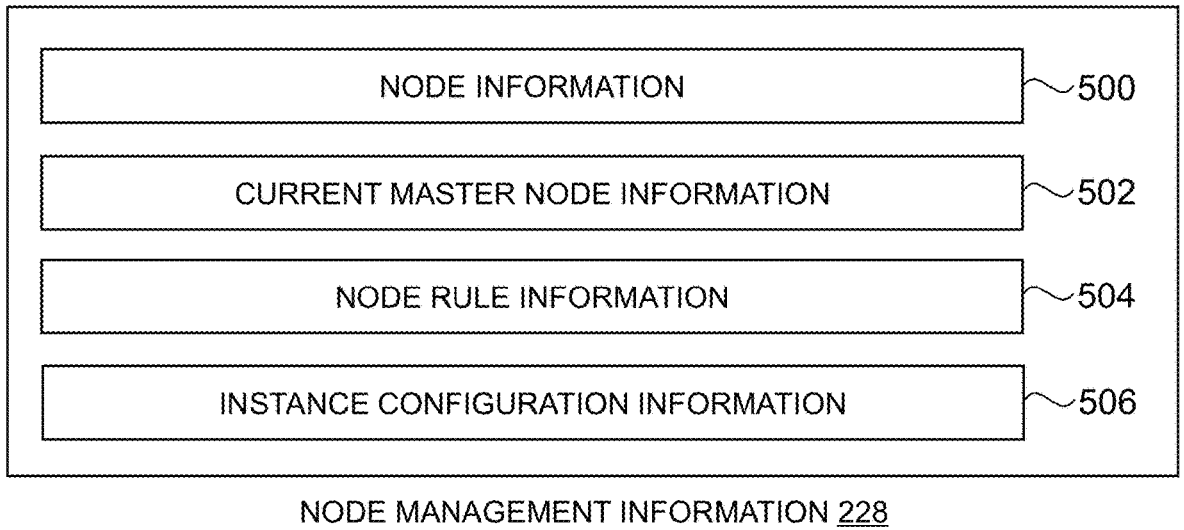
FIG. 5A is a diagram showing a configuration example of node management information.
FIG. 5B is a diagram showing a configuration example of node information.

FIG. 5A is a diagram showing a configuration example of the node management information 228.

The node management information 228 is configured by node information 500 relating to each node that configures a multi node, current master node information 502 relating to the master node 120 that is the current master node, node rule information 504 relating to rules of the addition and deletion of the cache node 122, and instance configuration information 506 relating to the configuration at the time of the generation of a new instance.

FIG. 5B is a diagram showing a configuration example of the node information 500.

The node information 500 is information relating to each node that configures the multi node in the system, and has an entry for each node. Each entry has a field 510 in which an ID that uniquely identifies a node is registered, a field 512 in which the type (the master node or the cache node) of the node is registered, a field 514 in which an ID of a master node of a group to which the node belongs is registered, a field 516 in which an IP address of the node is registered, a field 518 in which the data capacity of the database that can be stored in the node is registered, and a field 520 in which the data size of the database stored in the node is registered.

Figure 5C:
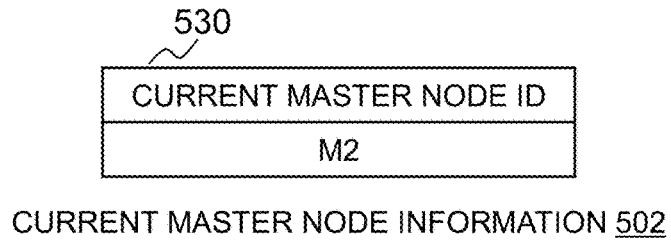
FIG. 5C is a diagram showing a configuration example of current master node information.

FIG. 5C is a diagram showing a configuration example of the current master node information 502.

The current master node information 502 is information relating to the master node that is the current node in the system, and has a field 530 in which an ID of the current master node is registered.

Figure 5D:
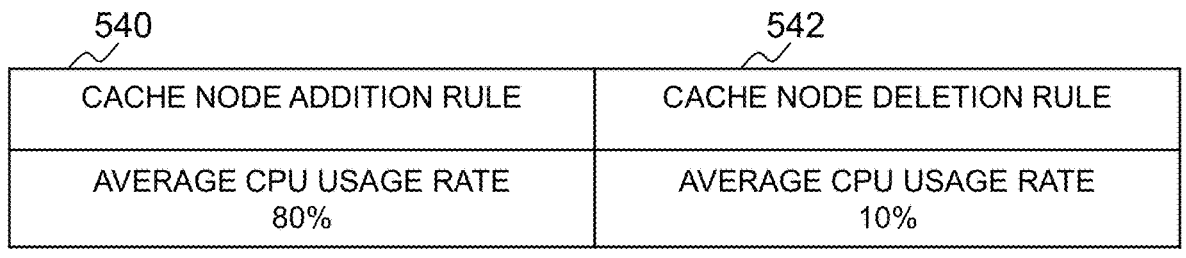
FIG. 5D is a diagram showing a configuration example of node rule information.

FIG. 5D is a diagram showing a configuration example of the node rule information 504.

The node rule information 504 is information relating to rules of the addition and deletion of the cache node 122, and has a field 540 in which an addition rule of the cache node 122 is registered and a field 542 in which a deletion rule of the cache node 122 is registered. The addition rule of the cache node 122 may be a case where the load of at least one cache node 122 in the group 130 exceeds a first threshold value, for example, a case where the overall average CPU usage rate of the cache nodes 122 in the group 130 exceeds 80%. The deletion rule of the cache node 122 may be a case where the load of at least one cache node 122 in the group 130 is equal to or smaller than a second threshold value (the second threshold value is equal to or smaller than the first threshold value), for example, a case where the overall average CPU usage rate of the cache nodes 122 in the group 130 falls below 10%. Those rules are set in advance by the database system manager, for example. In this embodiment, the CPU usage rate is used in both of the addition rule and the deletion rule, but a rule using other load indices such as the IOPS may be employed as at least one of the addition rule and the deletion rule.

Figure 5E:
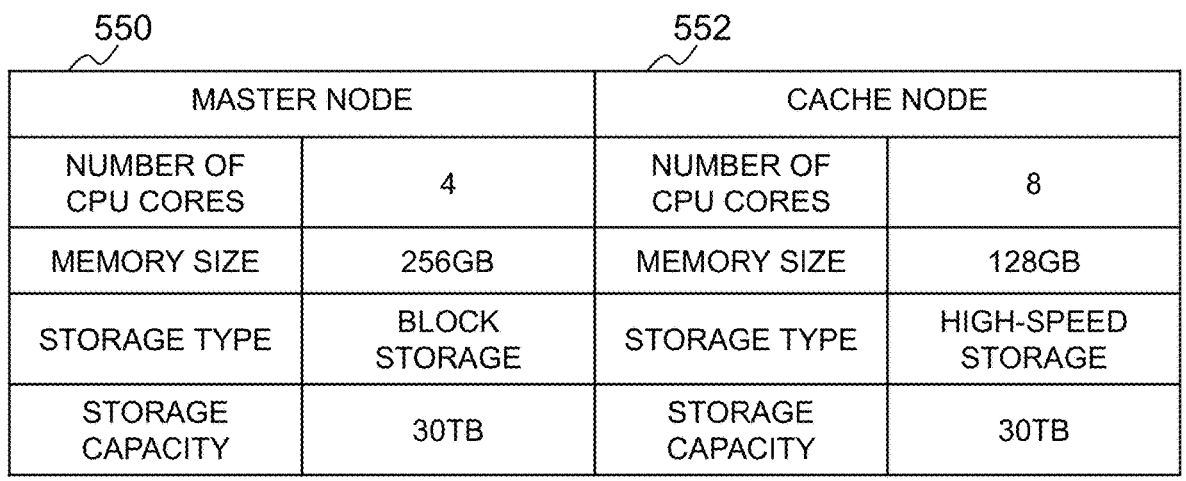
FIG. 5E is a diagram showing a configuration example of instance configuration information.

FIG. 5E is a diagram showing a configuration example of the instance configuration information 506.

The instance configuration information has a field 550 in which a master node configuration (an instance configuration for the master node) is registered and a field 552 in which a cache node configuration (an instance configuration for the cache node) is registered. Each field stores therein information on the memory size, the storage type, the storage capacity, and the number of CPU cores that configure the instance. The information is set in advance by the database manager and the like, and is referred to at the time of the generation of a new instance. According to the example shown in FIG. 5E, in order to cause the cache node to have a better read performance (a data retrieval performance in this embodiment) than the master node, a storage of which speed is higher than that of the storage of the master node is employed, and CPU cores of which number is larger than the CPU cores of the master node are employed, for example, for the cache node.

FIG. 6A is a diagram showing a configuration example of the data management information 230.

The data management information 230 indicates the storage position of the data in the database. Specifically, for example, the data management information 230 is information relating to data registered in the database, and has an entry for each registered data. Each entry has a field 600 in which the ID of the master node in which data is registered is registered, a field 602 in which an ID of a table in which the data is registered is registered, a field 604 in which an ID of a column in which the data is registered is registered, a field 606 in which information relating to the start of the data (for example, the start date of a period indicated by the data or the storage start date of the data) is registered, and a field 608 in which information relating to the end of the data (for example, the end date of a period indicated by the data or the storage end date of the data) is registered.

FIG. 6B is a diagram showing a configuration example of the cache node management information 232.

The cache node management information 232 is information with which the master node 120 manages the cache node 122 in the same group, and each master node 120 has entries by the number of nodes of the cache nodes 122 in the same group. FIG. 6B exemplifies cache node management information 232A managed by the DBMS 212 of the master node 120 in one certain group, and cache node management information 232B managed by the DBMS 212 of the master node 120 in another certain group. Each entry has a field 610 in which an ID that identifies the cache node 122 is registered, a field 612 in which the state of the cache node 122 is registered, a field 614 in which the CPU usage rate of the cache node 122 is registered, a field 616 in which the I/O Per Second (IOPS) of the cache node 122 is registered, and a field 618 in which the throughput of the cache node 122 is registered. At least one of the state of the cache node, the CPU usage rate, the IOPS, and the throughput may be equivalent to one example of the operating status of the cache node. At least one of the CPU usage rate, the IOPS, and the throughput of the cache node may be equivalent to one example of the load of the cache node.

(2) Addition Processing of Cache Node in this Embodiment

Figure 7A:
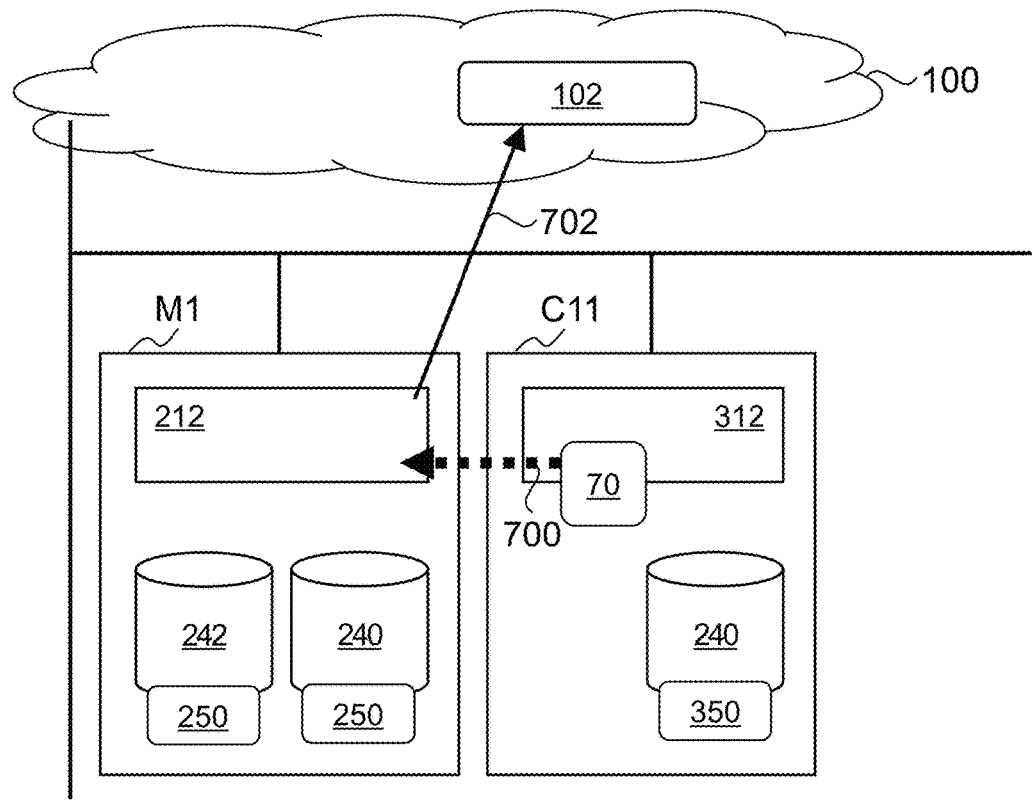
FIG. 7A is a diagram showing one part of a processing example of cache node addition.
Figure 7B:
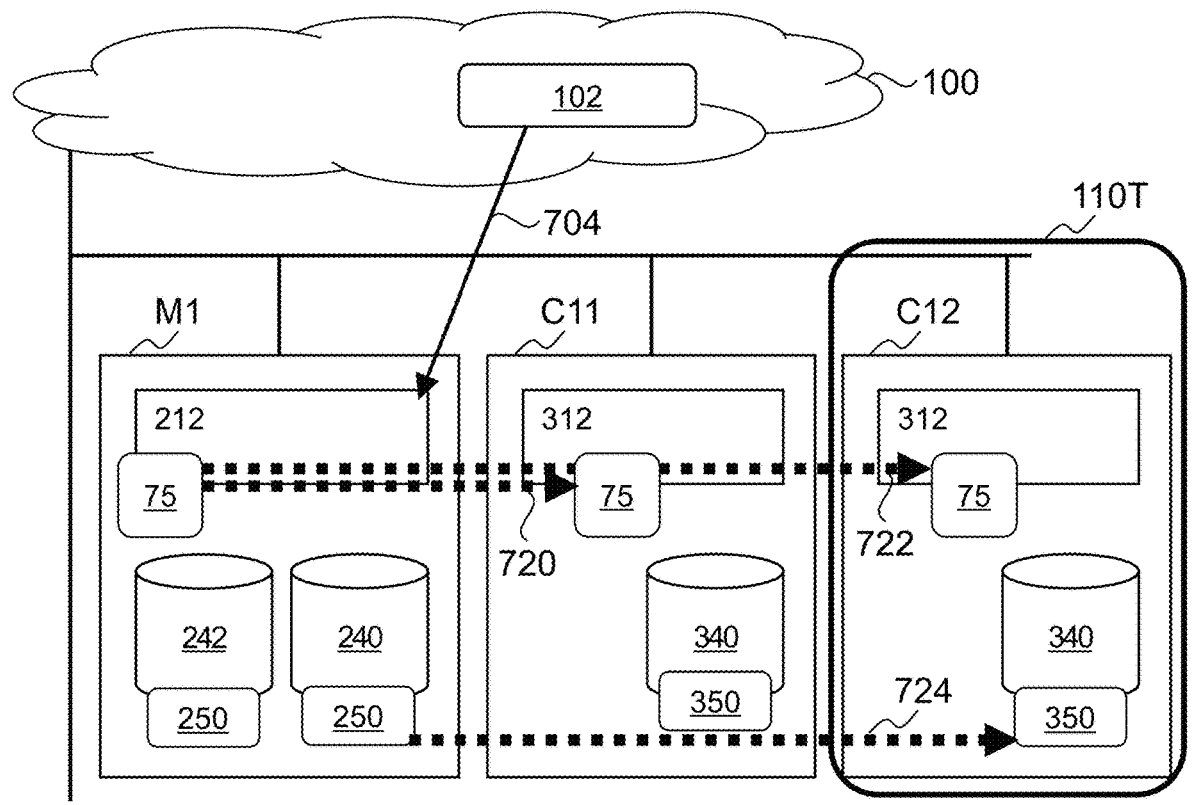
FIG. 7B is a diagram showing the remainder of the processing example of the cache node addition.

FIG. 7A and FIG. 7B are diagrams showing a flow of addition processing of the cache node 122. Here, in order to simplify the description, there is one group 130, the group 130 is configured by a master node M1 and a cache node C11, and a cache node C12 is added to the group 130. In the description below, information including the DB management information 226, the node management information 228, and the data management information 230 is referred to as "management information 75". In the description below, the expression of "perform synchronization of the management information 75" means that the content of the (newest) management information 75 after the update is reflected (typically copied) in the management information 75 before the update, so that the contents of the management information 75 are caused to be the same. Similarly, the expression of "perform synchronization of the database" means that the content of the database after the update is reflected (typically copied) in the database before the update, so that the contents of the database are caused to be the same.

First, as processing before the addition, as shown in FIG. 7A, the DBMS 312 of the cache node C11 acquires monitor data 70 including metric values such as the IOPS and the CPU usage rate by periodically executing the monitor command 334 of the OS 314, and transmits the monitor data 70 to the master node M1 (arrow 700). The DBMS 212 of the master node M1 that has received the information calculates the average CPU usage rate of all of the cache nodes (only the cache node C11 here) in the same group 130. When the calculated average CPU usage rate exceeds a threshold value set in the field 540 of cache node addition rule, the DBMS 212 of the master node M1 requests the cloud management unit 102 to generate a new instance for the cache node (arrow 702).

As shown in FIG. 7B, the cloud management unit 102 that has accepted the request for the generation of an instance generates a requested instance 110T, and transmits information (for example, an IP address) relating to the instance 110T to the DBMS 212 that is the request source (arrow 704). After the generation of the instance, the installation and the environment setting of the OS and the installation and the environment setting of the DBMS need to be performed. However, in this embodiment, after the generation of a new instance, the instance automatically becomes useable by the execution of a script, for example.

The DBMS 212 of the master node M1 that has received information relating to the generated instance 110T updates the management information 75 (node information 500) on the basis of the information and performs synchronization between the management information 75 and the management information 75 of the cache node C11 in the same group 130 (arrow 720). The DBMS 212 of the master node M1 transmits the management information 75 to the DBMS 312 of the newly generated instance (cache node C12) (arrow 722), and transmits the data of the database 250 stored in the block storage 242 (or the high-speed storage 240) to the high-speed storage 340 of the cache node C12 (arrow 724). By the completion of the data transmission, the newly added cache node C12 becomes useable, and the master node M1 adds an entry of the newly added cache node C12 to the cache node management information 232.

In the example of the addition processing of the cache node 122 above, a configuration of one group, one master node, and one cache node has been employed in order to simplify the description, but there may be a plurality of the groups 130 or there may be a plurality of the cache nodes 122 in the same group 130 in actuality. When there are a plurality of the groups 130, the above-mentioned processing may be performed for each group 130, the management information 75 updated at the time of the cache node addition may be propagated from the master node 120 that has performed the update to the master node 120 of another group 130 and may be propagated from the master node 120 to the cache node 122 in the same group. When there are a plurality of the cache nodes 122 in the same group 130, all of the cache nodes 122 may acquire and transmit the monitor data 70, and the master node 120 may determine whether the cache node is to be added on the basis of the monitor data 70.

(3) Deletion Processing of Cache Node in this Embodiment

Figure 8A:
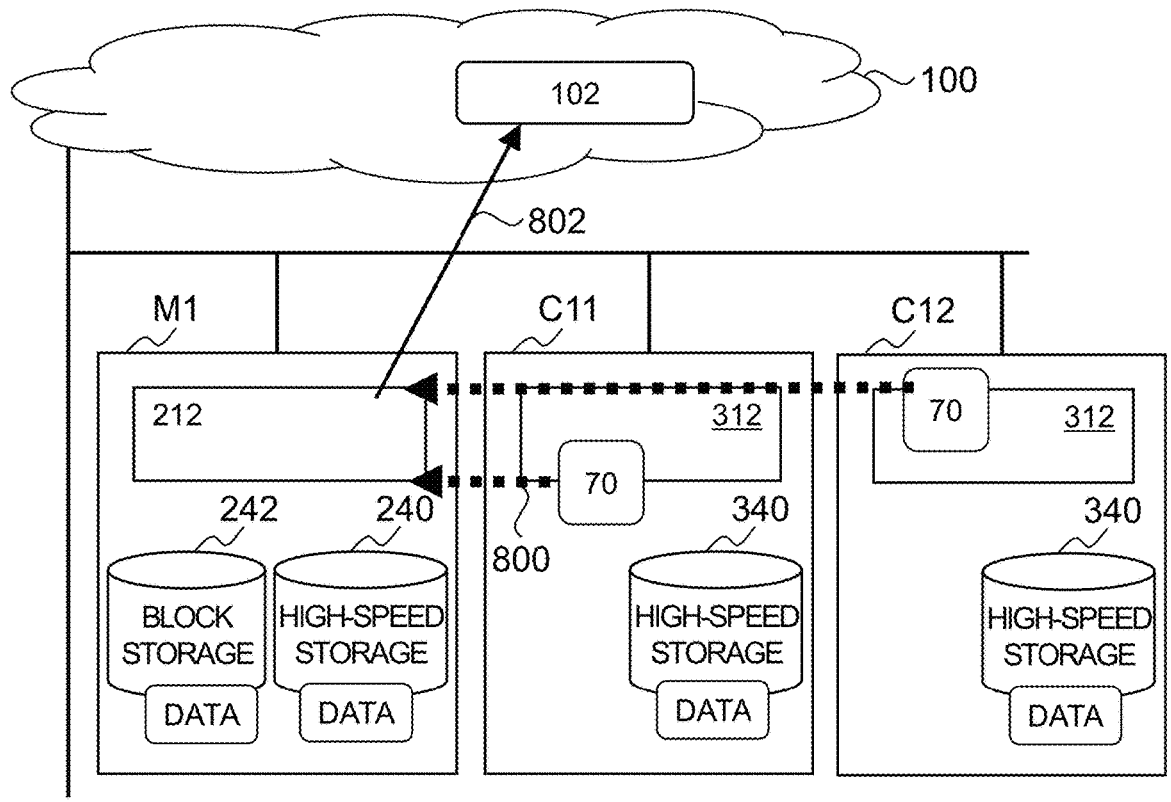
FIG. 8A is a diagram showing one part of a processing example of cache node deletion.
Figure 8B:
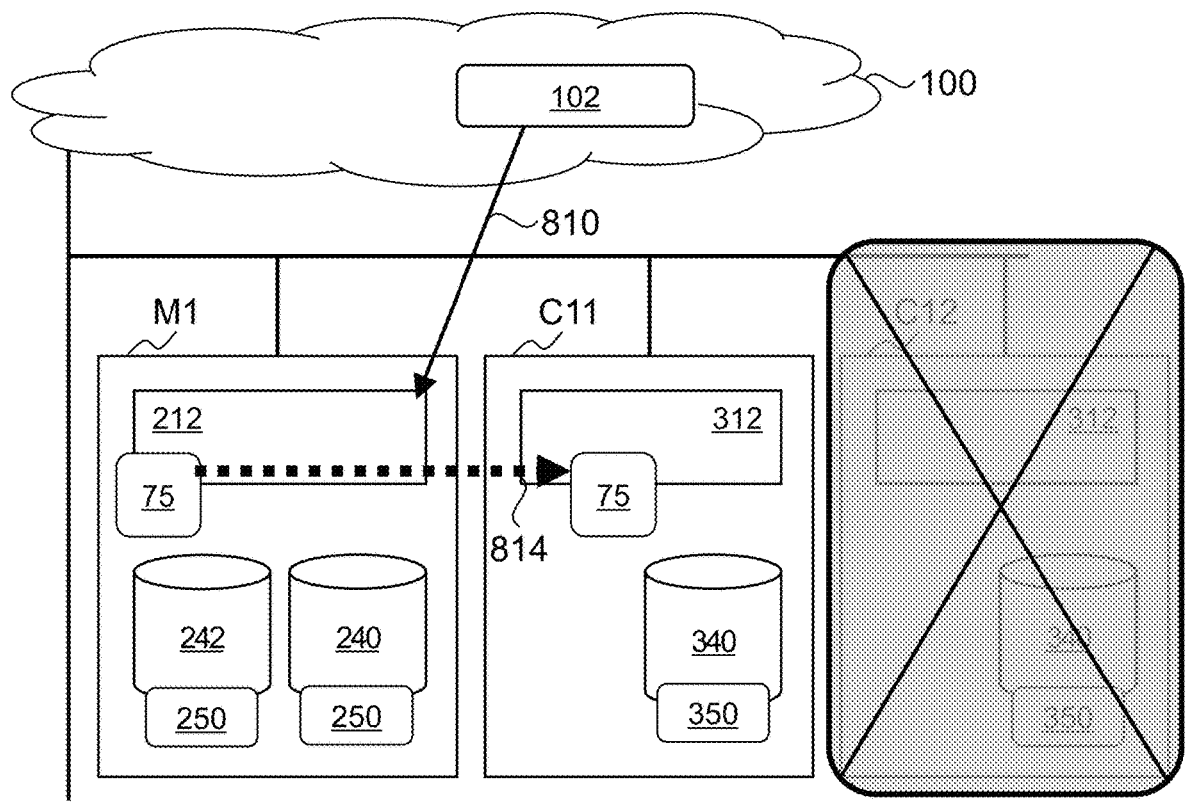
FIG. 8B is a diagram showing the remainder of the processing example of the cache node deletion.

FIG. 8A and FIG. 8B are diagrams showing a flow of deletion processing of the cache node 122. Here, in order to simplify the description, there is one group 130, the group 130 is configured by the master node M1 and the cache nodes C11 and C12, and the cache node C12 is deleted from the group.

First, as processing before deletion, as shown in FIG. 8A, in each of the cache nodes C11 and C12, the DBMS 312 periodically executes the monitor command 334 of the OS 314, acquires the monitor data 70 including metric values such as the IOPS and the CPU usage rate, and transmits the monitor data 70 to the master node M1 (arrow 800). The DBMS 212 of the master node M1 that has received the information calculates the average CPU usage rate of all of the cache nodes C11 and C12 in the same group 130. When the calculated average CPU usage rate falls below a threshold value set in the field 542 of the cache node deletion rule, the DBMS 212 of the master node M1 selects an instance of the cache node (the cache node C12 here) with the lowest CPU usage rate and transmits an instance deletion request that specifies the selected instance to the cloud management unit 102 (arrow 802).

As shown in FIG. 8B, the cloud management unit 102 that has accepted the request for the deletion of the instance executes the deletion of the requested instance (C12) and transmits a deletion result (information relating to the deleted instance) to the DBMS 212 that is the request source (arrow 810).

The DBMS 212 of the master node M1 that has received the information relating to the deleted instance updates the node information 500 in the management information 75 on the basis of the information, performs synchronization of the updated management information 75 with a cache node (the cache node C11 here) in the same group 130 (arrow 814), and deletes an entry of the deleted cache node C12 from the cache node management information 232.

In the example of the deletion processing of the cache node 122 above, a configuration of one group, one master node, and two cache nodes has been employed in order to simplify the description, but there may be a plurality of the groups 130 in actuality, and the above-mentioned processing may be performed for each group 130 in this case. The management information 75 updated at the time of the cache node deletion is propagated from the master node M1 that has performed the update to the master node 120 of another group 130 and is propagated from the master node 120 to the cache node 122 in the same group 130. The cache node 122 that remains even when the number of the cache nodes 122 in the group 130 becomes one may be deleted. However, one or a plurality of the cache nodes 122 may be left because execution cannot be immediately performed when the data retrieval is assigned.

(4) Data Import Processing 1 in this Embodiment

FIG. 9 is a diagram showing a flow of data import processing that does not involve the addition of a master node. Here, in order to simplify the description, there is one group 130, the group 130 is configured by the master node M1 and the cache nodes C11 and C12, and data is imported into the master node M1 that is the current master node.

The application 106 transmits an import request with which an import file 902 in which data to be imported is stored is associated to the DBMS 212 of the current master node M1 (arrow 900).

The DBMS 212 of the master node M1 that has received the import request of the data refers to the DB area information 400 in the management information 75 and determines whether the data to be imported can be stored in the block storage 242. The expression of "the data to be imported can be stored in the block storage 242" may mean that a condition meaning that the free area in the block storage 242 is sufficient is satisfied (for example, the capacity of the free area is equal to or larger than the data capacity of the data to be imported). When it is determined that storage is possible, the DBMS 212 imports the data into the database 250 of the block storage 242 from the import file 902 (arrow 904) by executing the import request. After the import of the data is completed, the DBMS 212 updates the management information 75 (the DB area information 400 and the data management information 230) in accordance with the content of the imported data, and performs synchronization between the management information 75 after the update and the management information 75 in the cache nodes C11 and C12 in the same group 130 (arrow 906).

The DBMS 212 of the master node M1 performs synchronization between the block storage 242 and the high-speed storage 240, in other words, copies the imported data to the high-speed storage 240 from the block storage 242 (arrow 910). Then, the DBMS 212 performs synchronization between the high-speed storage 240 of the master node M1 and the high-speed storages 340 in the cache nodes C11 and C12 in the same group 130, in other words, copies the imported data to the high-speed storages 340 from the high-speed storage 240 (arrow 912). Synchronization may be performed between the block storage 242 of the master node M1 and the high-speed storages 340 in the cache nodes C11 and C12. When there a plurality of cache nodes in the same group 130, synchronization may be performed in the order from the cache node with the lowest load on the basis of the load (for example, the operating status) of each cache node.

(5) Data Import Processing 2 in this Embodiment

Figure 10:
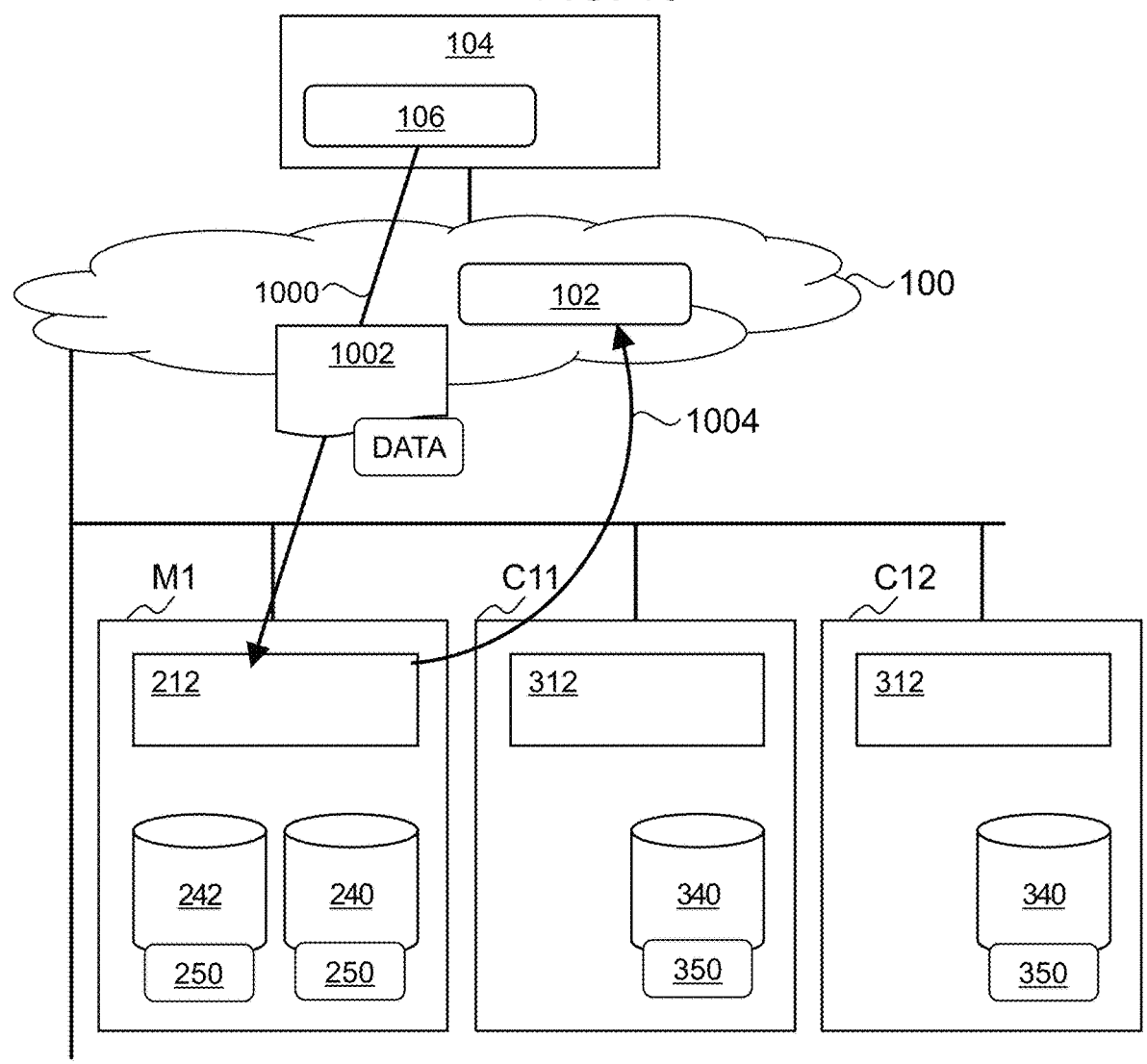
FIG. 10 is a diagram showing a first portion of a processing example of data import involving the addition of a new group.
Figure 11:
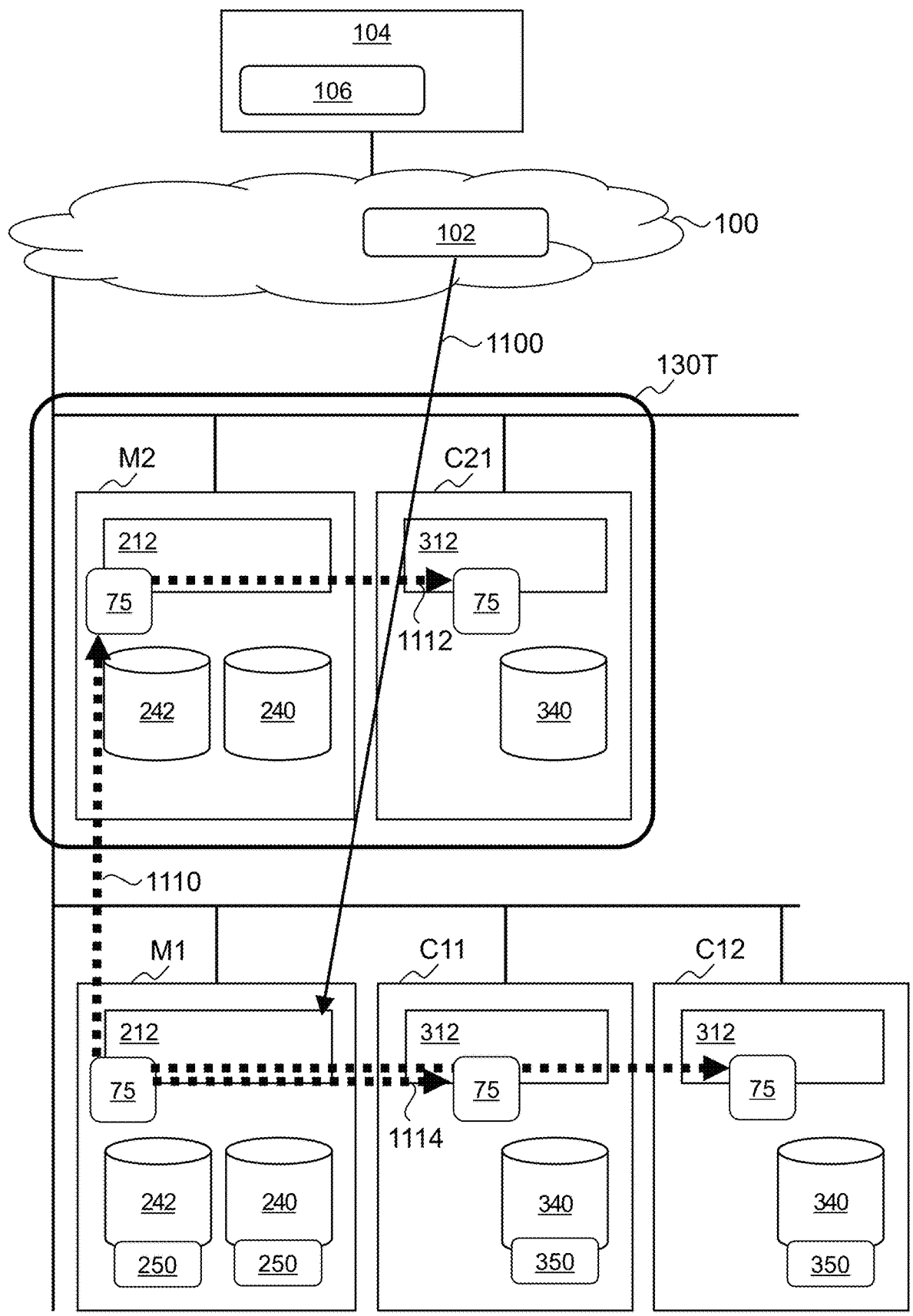
FIG. 11 is a diagram showing a second portion of the processing example of the data import involving the addition of a new group.
Figure 12:
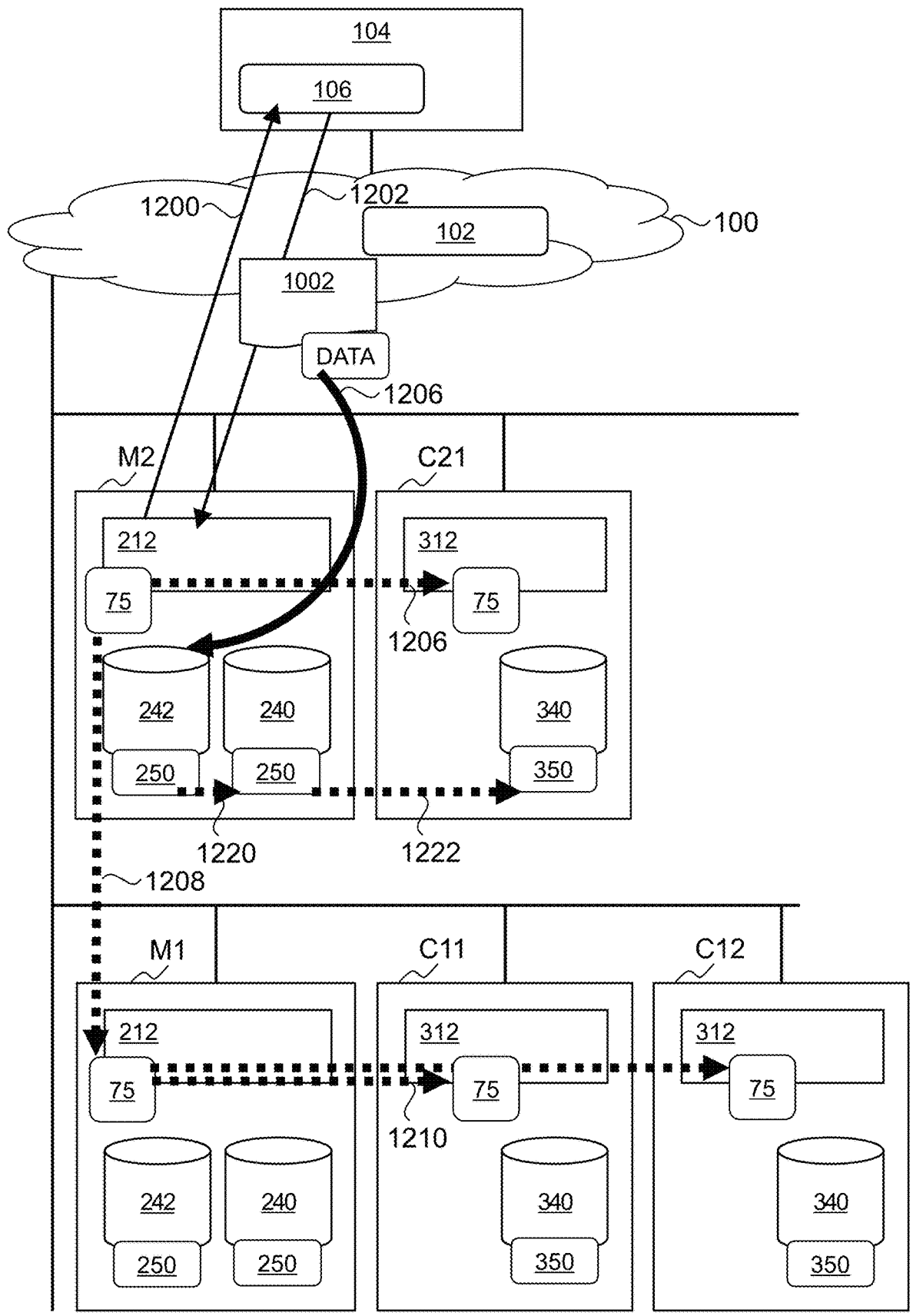
FIG. 12 is a diagram showing the remaining portion of the processing example of the data import involving the addition of a new group.

FIG. 10, FIG. 11, and FIG. 12 are diagrams showing a flow of data import processing involving the addition of the master node. Here, in order to simplify the description, there is one group 130, the group 130 is configured by the master node M1 and the cache nodes C11 and C12, the data is to be imported into the current master node M1, but a group 130T configured by a master node M2 and a cache node C21 is newly generated due to the lack of area, and the data is imported into the newly added master node M2.

As shown in FIG. 10, the application 106 transmits an import request with which an import file 1002 in which the data to be imported is stored is associated to the DBMS 212 of the current master node M1 (arrow 1000).

The DBMS 212 of the master node M1 that has received the import request refers to the DB area information 400, and determines whether the data to be imported can be stored in the block storage 242 that stores the data of the database therein. The expression of "the data to be imported can be stored in the block storage 242" may mean that a condition meaning that the free area in the block storage 242 is insufficient is satisfied (for example, the capacity of the free area is smaller than the data capacity of the data to be imported). When it is determined that storage cannot be performed, the DBMS 212 requests the cloud management unit 102 to generate a new instance for the master node and a new instance for the cache node, that is, a total of two instances (arrow 1004). The number of the instances for the cache node that are generated here may be two or more.

As shown in FIG. 11, the cloud management unit 102 that has received the request for the generation of an instance generates an instance for the master node M2 and an instance for the cache node C21 that are requested, and transmits information (for example, IP addresses) relating to those instances to the DBMS 212 that is the request source (arrow 1100).

The DBMS 212 of the master node M1 that has received the information relating to the generated instances updates the management information 75 (node information 500) on the basis of the information, and performs synchronization between the management information 75 after the update and the management information 75 of the cache nodes C11 and C12 in the same group 130 (arrow 1114). The DBMS 212 of the master node M1 transmits the management information 75 to the DBMS 212 of the newly generated instance (master node M2) (arrow 1110), and sets an ID of the master node M2 in the current master node information 502.

The DBMS 212 of the current master node M2 that has received the management information 75 from the DBMS 212 of the master node M1 updates the DB area information 400 in accordance with own environment, and generates cache node management information 232. After the generation, the DBMS 212 adds an entry of the instance (cache node C21) that is simultaneously generated, registers information in the entry, and transmits the management information 75 (the DB management information 226, the node management information 228, and the data management information 230) to the DBMS 312 of the cache node C21 (arrow 1112). When there are a plurality of newly generated cache nodes, the management information 75 is transmitted to all of the newly generated cache nodes.

As shown in FIG. 12, the DBMS 212 of the master node M2 that has become the current node gives an instruction for requesting the import of the data again to the application 106 of the client 104 that has requested the import of the data (arrow 1200). The application 106 that has received the instruction transmits an import request with which the import file 1002 in which the data to be imported is stored is associated to the DBMS 212 of the current master node M2 (arrow 1202).

The DBMS 212 of the master node M2 that has received the import request of the data executes the import request, and imports the data into the block storage 242 from the import file 1002 (arrow 1206). After the import of the data is completed, the DBMS 212 of the master node M2 updates the management information 75 (the DB area information 400 and the data management information 230) on the basis of the content of the imported data, and performs synchronization between the management information 75 after the update and the management information 75 of the cache node C11 in the same group 130 (arrow 1206). The DBMS 212 of the current master node M2 also performs synchronization between the management information 75 of the DBMS 212 of each master node (the master node M1 here) other than the current master node M2 and the management information 75 after the update (arrow 1208). When there are a plurality of master nodes in the system, synchronization with the management information after the update is performed for the management information of all of the master nodes. The DBMS 212 of the master node M1 having the updated management information 75 performs synchronization between the management information 75 of all of the cache nodes (the cache nodes C11 and C12 here) in the same group 130 and the management information 75 after the update in the master node M1 (arrow 1210).

The DBMS 212 of the current master node M2 performs synchronization between the database 250 in the block storage 242 and the database 250 in the high-speed storage 240, in other words, copies the data imported in the block storage 242 to the high-speed storage 240 (arrow 1220). Then, the DBMS 212 performs synchronization between the database in the high-speed storage 240 of the master node M2 and the database in the high-speed storage 340 in the cache node C21 in the same group 130, in other words, copies the imported data to the high-speed storage 340 from the high-speed storage 240 (arrow 1222). Synchronization may be performed between the database in the block storage 242 of the master node M2 and the database in the high-speed storage 340 of the cache node C21.

As above, in the data import processing involving the addition of the master node, data is imported into the added master node M2 and is not imported into the existing master node M1. As a result, the content of the database differs for each group 130. Therefore, the retrieval range in accordance with a search query received by the current master node from the application 106 is any of the below.

A range configured by all or one part of a database in the newest group 130 to which the current master node belongs.

A range configured by all or one part of a database in the newest group 130 to which the current master node belongs and all or one part of a database in one or more groups to which one or more master nodes other than the current master node belong.

A range that does not include at least one part of a database in the newest group 130 to which the current master node belongs and is configured by all or one part of a database in at least one group out of one or more groups to which one or more master nodes other than the current master node belong.

(6) Query Execution Processing 1 in this Embodiment

Figure 13:
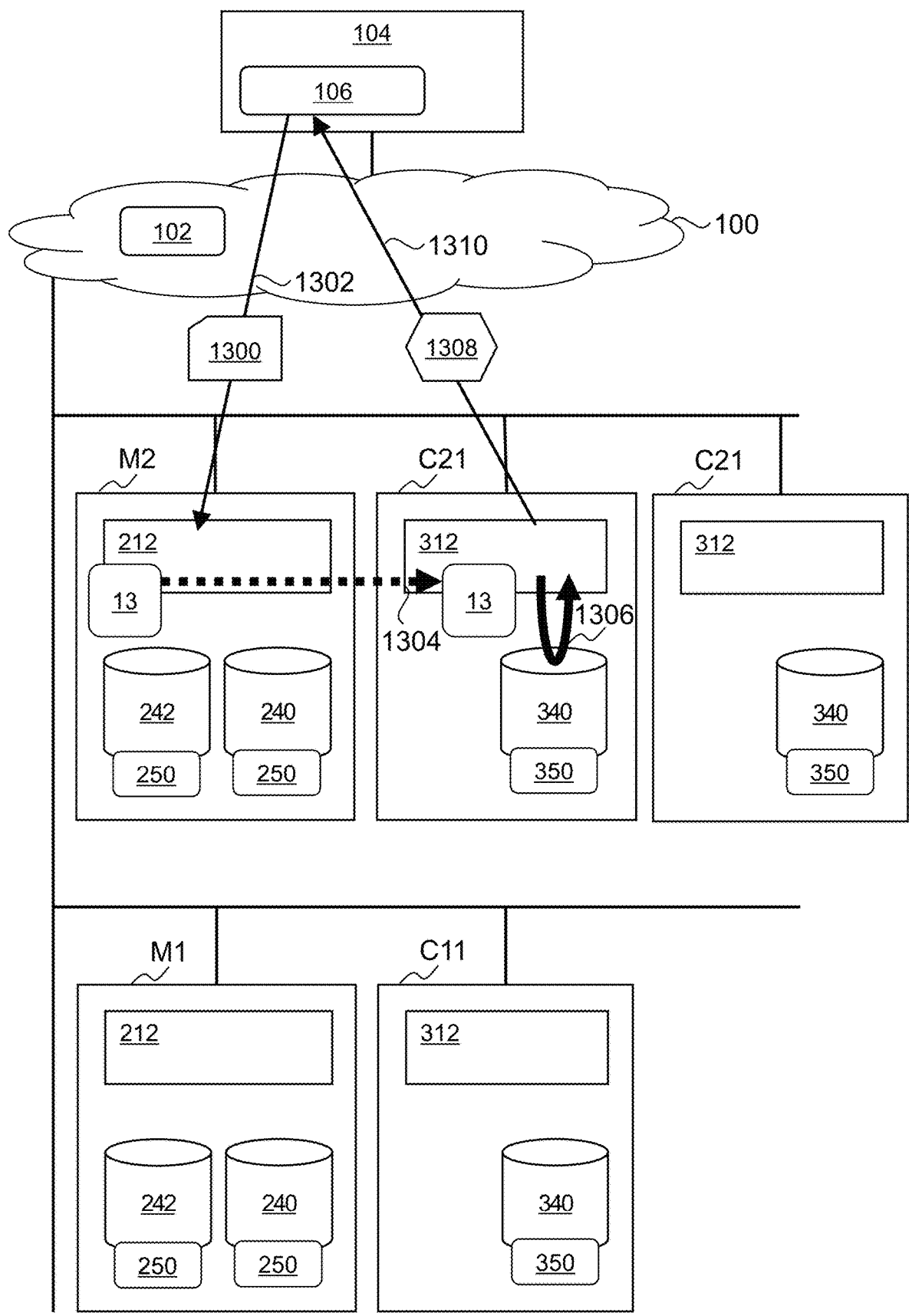
FIG. 13 is a diagram showing a processing example of search query execution that fits in one group.

FIG. 13 is a diagram showing a flow of query execution processing when the execution of a search query is possible in the group of the current master node. Here, there are two groups, the first group is configured by the master node M1 and the cache node C11, the second group is configured by the master node M2, the cache node C21, and a cache node C22, and the master node M2 is the current master node.

The DBMS 212 of the current master node M2 accepts a search query 1300 from the application 106 (arrow 1302).

The DBMS 212 of the master node M2 that has received the search query 1300 analyzes the search query 1300 and generates a query plan 13. After the generation of the query plan, the DBMS 212 refers to the cache node management information 232, determines the cache node with the lowest CPU load (CPU usage rate) out of the cache nodes in the same group 130 (the cache node C21 here), and transmits a search query with which the generated query plan 13 and information relating to the query source (the client 104 and/or the application 106) are associated to the DBMS 312 of the cache node C21 (arrow 1304). The transmitted search query is a search query based on the search query 1300 (in other words, the original search query) received by the DBMS 212, and specifically may be the search query 1300 itself or may be a search query generated with use of the search query 1300, for example. The DBMS 212 of the master node M2 generates the query plan 13 and transmits the generated query plan 13 to the cache node C21 here, but the DBMS 212 may transmit the search query 1300 to the cache node C21 in an unchanged state, and the DBMS 312 of the cache node C21 may analyze the search query 1300 and generate the query plan. As the condition for the cache node to be determined, other types of conditions (for example, a condition that another type of load be the lowest instead of or in addition to the CPU load) may be employed instead of the condition that the CPU load be the lowest.

The DBMS 312 of the cache node C21 that has received the search query refers to the management information 75 (data management information 230) and determines whether all of the data to be accessed in accordance with the query plan 13 associated with the received search query exists in the database in the high-speed storage 340 of the own node C21. When all of the data exists, the DBMS 312 executes the search query, in other words, executes the data retrieval from the database in the high-speed storage 340 (arrow 1306). After the completion of the query execution, the DBMS 312 of the cache node C21 transmits an execution result 1308 to the application 106 of the client 104 determined from the information associated with the search query received from the DBMS 212 (arrow 1310).

(7) Query Execution Processing 2 in this Embodiment

Figure 14:
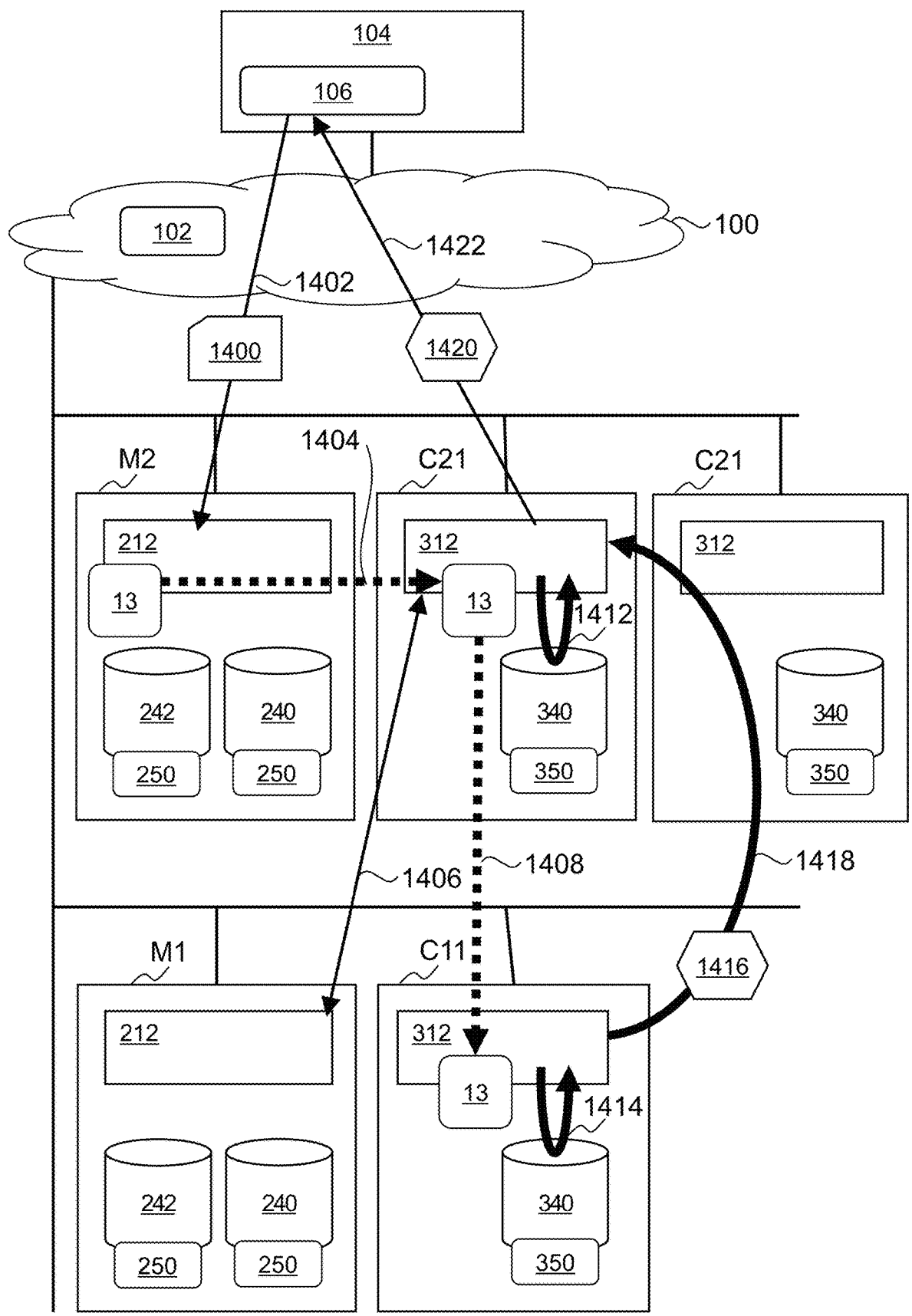
FIG. 14 is a diagram showing a processing example of search query execution that extends across a plurality of groups.

FIG. 14 is a diagram showing a flow of query execution processing when the search query is executed across a plurality of groups. Here, there are two groups 130, the first group 130 is configured by the master node M1 and the cache node C11, the second group 130 is configured by the master node M2 and the cache nodes C21 and C22, and master node M2 is the current master node.

The DBMS 212 of the current master node M2 accepts a search query 1400 from the application 106 (arrow 1402).

The DBMS 212 of the master node M2 that has received the search query 1400 analyzes the search query 1400 and generates the query plan 13. After the generation of the query plan, the DBMS 212 refers to the cache node management information 232, determines the cache node with the lowest CPU load out of the cache nodes in the same group 130 (the cache node C21 here), and transmits a search query with which the generated query plan and information relating to a query source (the client 104 and/or the application 106) are associated to the DBMS 312 of the cache node C21 (arrow 1404). The DBMS 312 of the master node M2 transmits the generated query plan 13 to the cache node C21 here, but the DBMS 212 may transmit the search query 1400 to the cache node C21 in an unchanged state, and the DBMS 312 of the cache node C21 may analyze the search query 1400 and generate the query plan.

The DBMS 312 of the cache node C21 that has received the search query refers to the management information 75 (data management information 230), and determines whether all of the data to be accessed in accordance with the query plan 13 associated with the received search query exists in the database 350 in the high-speed storage 340 of the own node C21. When it is determined that there is data that does not exist even if the data is one part of data, the DBMS 312 determines the master node storing the data therein from the management information 75 (data management information 230) (the master node M1 here), and issues a cache node allocation request (in other words, a cache node inquiry) to the DBMS 212 of the determined master node M1 (arrow 1406). When a plurality of master nodes are determined, the same processing is performed for all of the determined master nodes. A search query for retrieving data from the database in the group to which the determined master node belongs may be transmitted to the DBMS 212 in the determined master node instead of the cache node allocation request. The DBMS 212 that has received the search query may transmit the search query to a cache node in the same group.

The DBMS 212 of the master node M1 that has accepted the cache node allocation request refers to the cache node management information 232, determines the cache node with the lowest CPU load out of the cache nodes in the same group (the cache node C11 here), and gives a response of an ID of the determined cache node C21 to the DBMS 312 of the cache node C21 that is the request source (arrow 1406).

The DBMS 312 of the cache node C21 that has received the response to the cache node allocation request transmits a search query with which the query plan 13 is associated to the DBMS 312 of the cache node C11 indicated by the received response (arrow 1408). The query plan 13 associated with the search query is the query plan 13 itself generated by the DBMS 212 of the current master node M2, but may be one part of the query plan 13 (a query plan including at least a portion corresponding to the retrieval range in accordance with the search query transmitted to the cache node C11) instead. The DBMS 312 of the cache node C21 executes data retrieval from the database 350 in the high-speed storage 340 of the own node C21 when at least one part of the data to be accessed in accordance with the query plan 13 from the current master node M2 exists in the database 350 in the high-speed storage 340 of the own node C21 (arrow 1412).

The DBMS 312 of the cache node C11 that has received the search query executes data retrieval from the database 350 in the high-speed storage 340 of the own node C11, in other words, executes the search query (arrow 1414). The DBMS 312 transmits an execution result 1416 to the DBMS 312 of the cache node C21 that is the request source (arrow 1418).

When the DBMS 312 of the cache node C21 that has received the execution result 1416 executes the search query in the own node C21, the DBMS 312 of the cache node C21 merges an execution result thereof and the received execution result 1416, and transmits an execution result 1420 after the merging to the application 106 of the client 104 determined from information associated with the search query from the current master node M2 (arrow 1422).

(8) Processing Flow in this Embodiment

Figure 15:
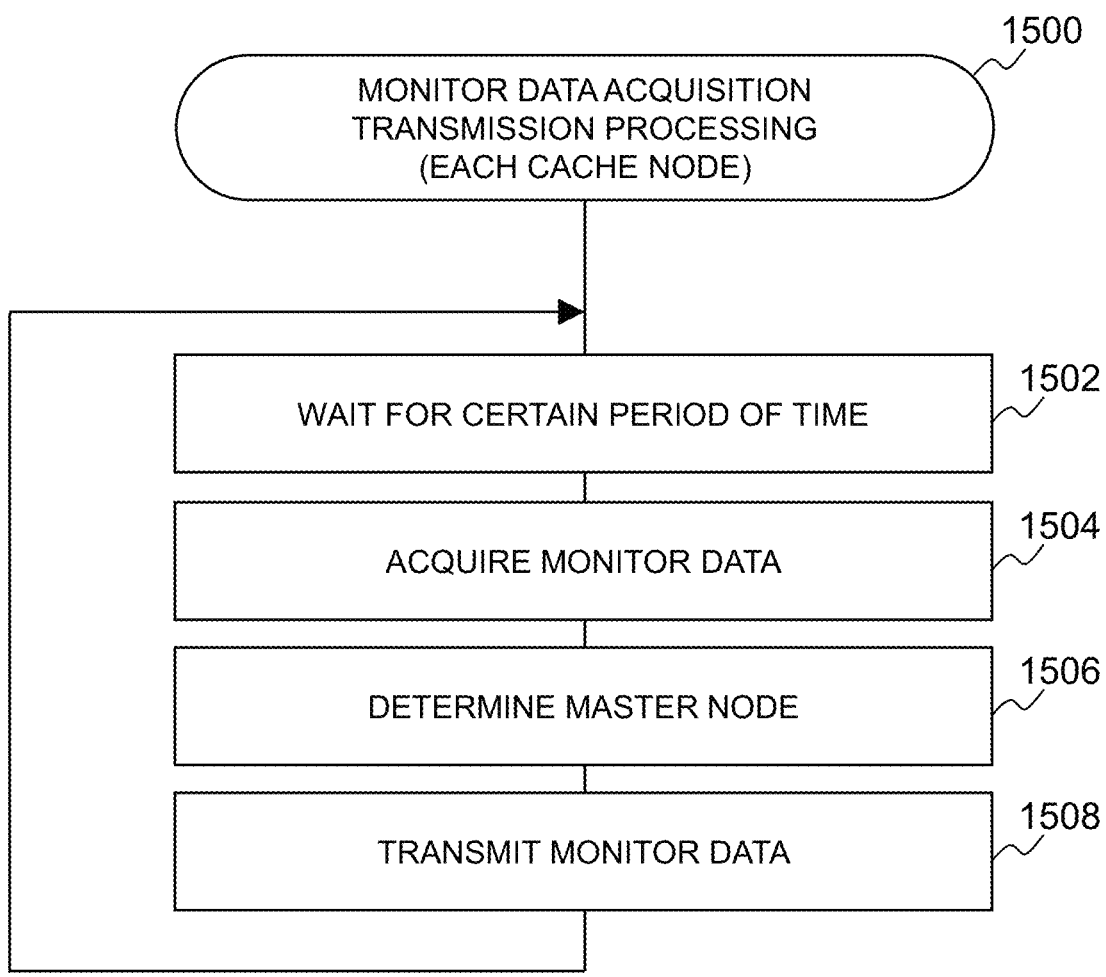
FIG. 15 is a flowchart showing one example of monitor data acquisition transmission processing.

FIG. 15 is a flowchart of monitor data acquisition transmission processing 1500 executed by the DBMS 312 of each cache node 122. One cache node 122 is taken as an example. The monitor data acquisition transmission processing 1500 may be performed by the node management unit 324 in the DBMS 312 of the cache node 122, for example.

The DBMS 312 of the cache node 122 waits for a certain period of time (Step 1502). Then, the DBMS 312 executes the monitor command 334 such as sar/mpstat/iostat that monitors the operating state of the CPU and I/O, and acquires monitor data such as the throughput, the CPU usage rate, and the IOPS (Step 1504). Next, the DBMS 312 of the cache node 122 that has acquired the monitor data refers to the node information 500, determines the master node 120 of the group to which the cache node 122 belongs (Step 1506), and transmits the acquired monitor data to the DBMS 212 of the master node 120 (Step 1508). The DBMS 312 of the cache node 122 repeatedly executes processing of Steps 1502 to 1508. A protocol of a determined transmission and reception format may be used for the transmission and reception of the monitor data between the master node 120 and the cache node 122, or the transmission and reception may be performed via a file and the like.

Figure 16:
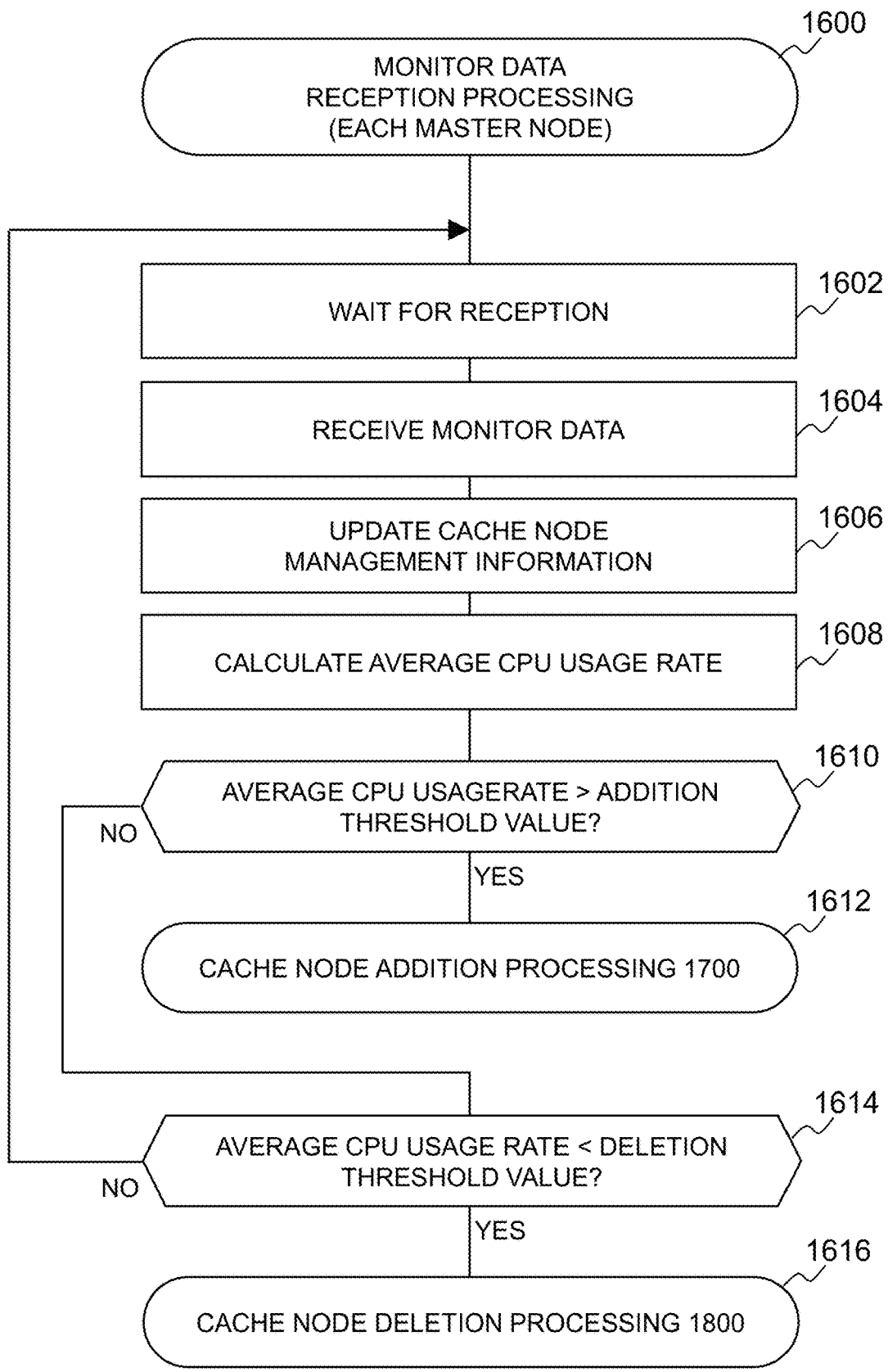
FIG. 16 is a flowchart showing one example of monitor data reception processing.

FIG. 16 is a flowchart of monitor data reception processing 1600 executed by the DBMS 212 of each master node 120. One master node 120 is taken as an example. The monitor data reception processing 1600 may be performed by the node management unit 224 in the DBMS 212 of the master node 120, for example.

The DBMS 212 of the master node 120 waits for the reception of monitor data from the DBMS 312 of the cache node 122 belonging to the same group (Step 1602), and receives the monitor data transmitted by the monitor data acquisition transmission processing 1500 of the DBMS 312 of the cache node 122 (Step 1604).

After the DBMS 212 of the master node 120 receives the monitor data from the DBMS 312 of the cache node 122, the DBMS 212 of the master node 120 updates the cache node management information 232 in accordance with the content of the received monitor data (Step 1606). Next, the DBMS 212 calculates an average CPU usage rate from the CPU usage rates of all of the cache nodes 122 belonging to the same group on the basis of the cache node management information 232 (Step 1608), and determines whether the calculated average CPU usage rate exceeds an addition threshold value (a threshold value set in the field 540 of the cache node addition rule of the node rule information 504) (Step 1610). When the average CPU usage rate exceeds the addition threshold value, the DBMS 212 executes cache node addition processing 1700 (Step 1612), and waits for the reception of monitor data from the cache node again. When the average CPU usage rate does not exceed the addition threshold value, the DBMS 212 determines whether the average CPU usage rate falls below a deletion threshold value (a threshold value set in the cache node deletion rule 542 of the node rule information 504) (Step 1614). When the average CPU usage rate falls below the deletion threshold value, the DBMS 212 executes cache node deletion processing 1800 (Step 1616), and waits for the reception of monitor data from the cache node again. When the average CPU usage rate does not fall below the deletion threshold value, the DBMS 212 similarly waits for the reception of monitor data from the cache node again.

Figure 17:
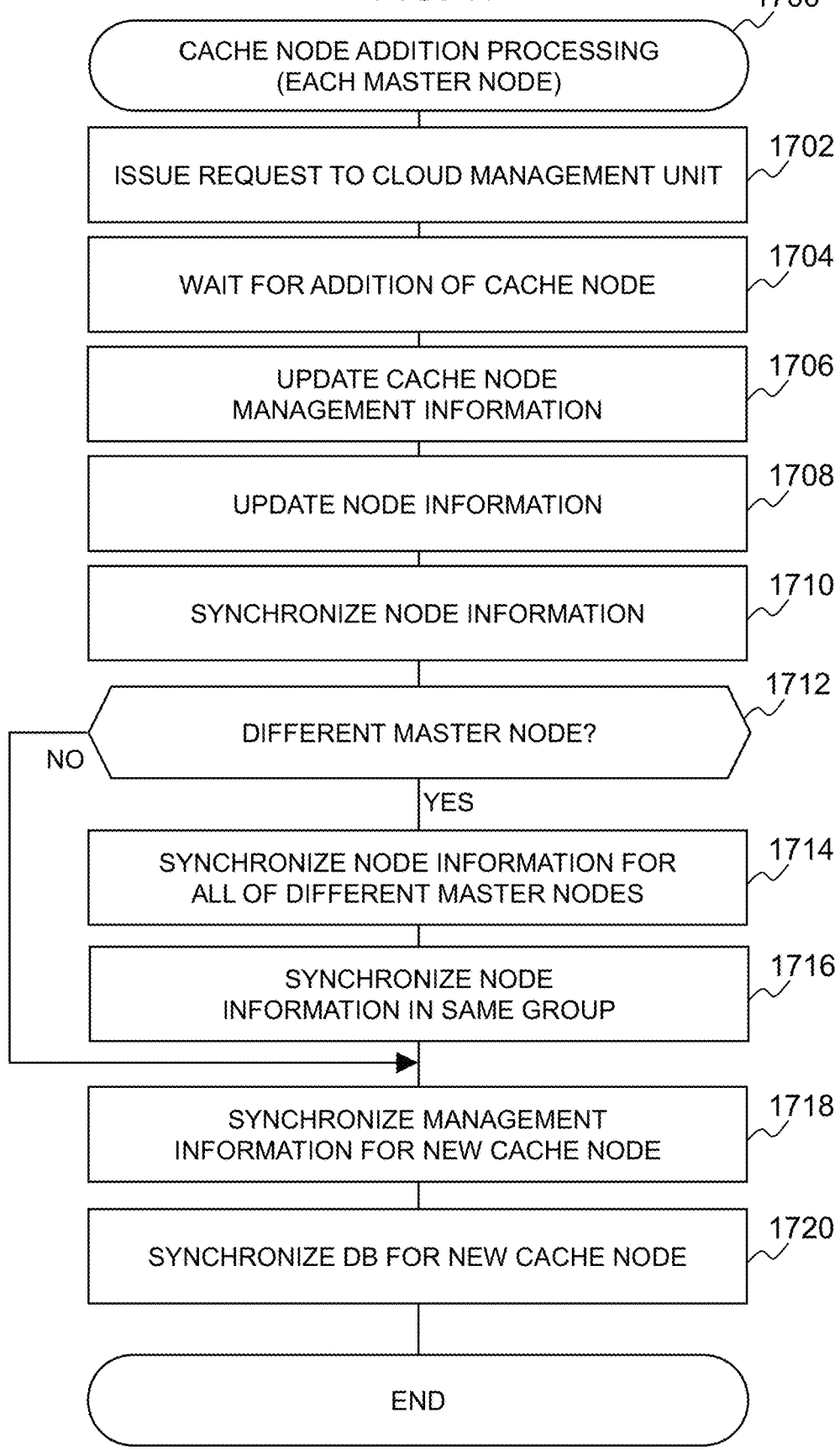
FIG. 17 is a flowchart showing one example of cache node addition processing.

FIG. 17 is a flowchart of the cache node addition processing 1700 executed by the DBMS 212 of each master node 120. One master node 120 is taken as an example. The cache node addition processing 1700 may be performed by the node management unit 224 in the DBMS 212 of the master node 120, for example.

The DBMS 212 of the master node refers to the instance configuration information 506, determines the cache node configuration set in the field 552 of the instance configuration for the cache node, and requests the cloud management unit 102 for the generation of a new instance having the configuration (Step 1702). The cloud management unit 102 that has received the request for the generation of an instance generates an instance having the requested configuration, and transmits information relating to the instance such as an IP address to the DBMS 212 that is the request source. After the generation of the instance, the installation and setting of the OS and the installation and the environment setting of the DBMS need to be performed. However, after the generation of a new instance, the instance automatically becomes useable by the execution of a script, for example, in this embodiment.

The DBMS 212 of the master node after requesting for the generation of a new instance waits for a response from the cloud management unit 102 (Step 1704). When there is a response, the DBMS 212 registers information associated with the response (information indicating the generated new instance (cache node)) to the cache node management information 232, and sets the state of the cache node as a usable state (Step 1706). Next, the DBMS 212 generates an entry of the newly generated cache node in the node information 500, and sets information in the entry on the basis of information associated with the response from the cloud management unit 102 (information indicating the generated new instance (cache node)) (Step 1708). After the generation of the cache node, the DBMS 212 refers to the node information 500, determines a cache node belonging to own group, and performs synchronization of the node information 500 for the DBMS 312 of the determined cache node (Step 1710).

Next, the DBMS 212 refers to the node information 500 and determines whether a master node other than a target master node that is the master node including the DBMS 212 exists (Step 1712). When a master node other than the target master node exists, the DBMS 212 performs synchronization of the node information 500 for the DBMS 212 of each master node other than the target master node (Step 1714). The DBMS 212 in the master node for which synchronization of the node information 500 has been performed refers to the node information 500 managed by the DBMS 212, determines a cache node belonging to the same group, and performs synchronization of the node information 500 for the DBMS 312 of the determined cache node (Step 1716).

The DBMS 212 of the target master node (the master node that has newly generated a cache node in the same group) performs synchronization of the management information 75 (the DB management information 226, the node management information 228, and the data management information 230) for the DBMS 312 of the newly generated cache node (Step 1718). The DBMS 212 performs synchronization by transmitting the data of the database stored in the high-speed storage 240 of the target master node to the high-speed storage 340 of the newly generated cache node (Step 1720).

Figure 18:
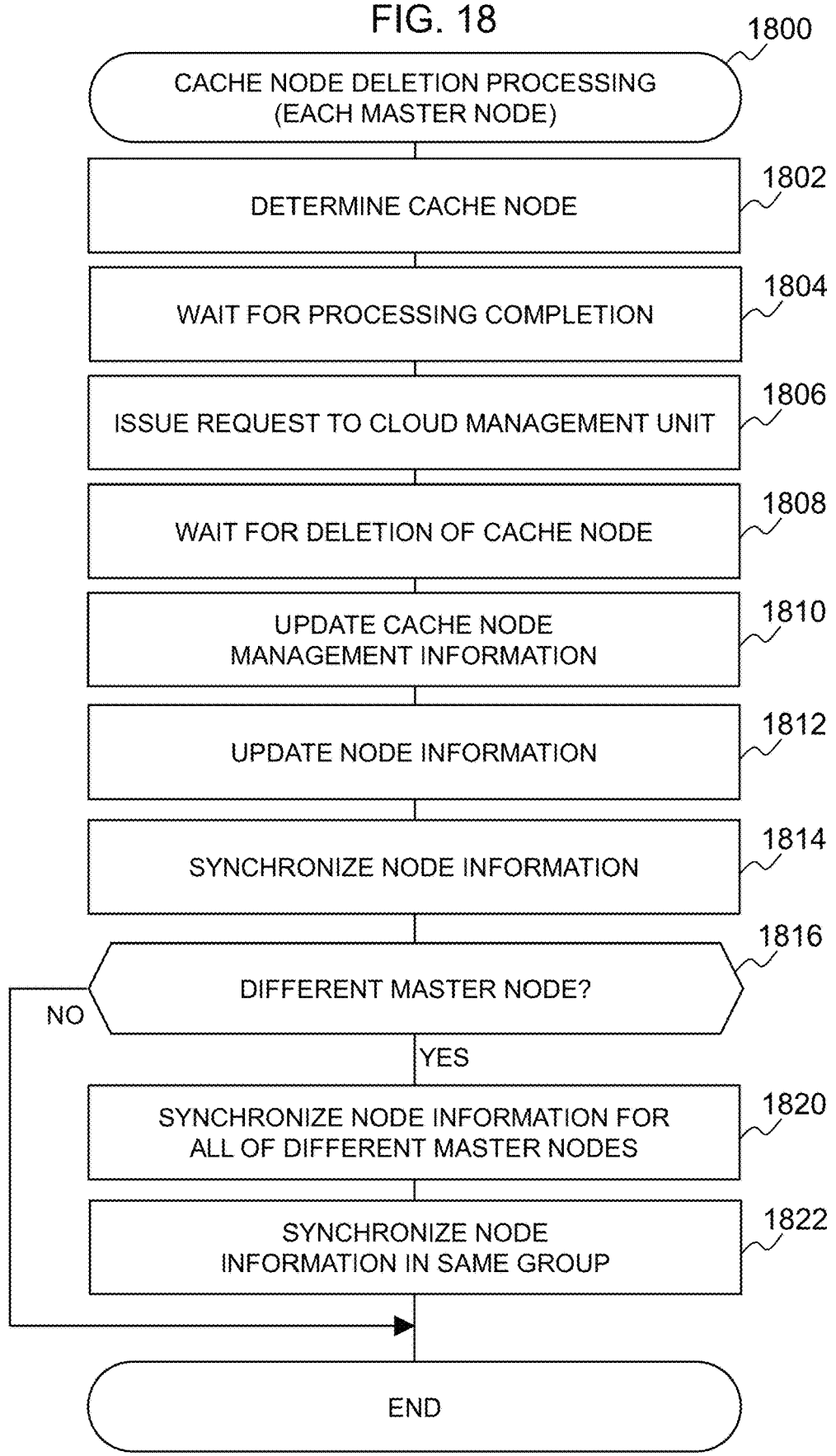
FIG. 18 is a flowchart showing one example of cache node deletion processing.

FIG. 18 is a flowchart of the cache node deletion processing 1800 executed by the DBMS 212 of each master node 120. One master node 120 is taken as an example. The cache node deletion processing 1800 may be performed by the node management unit 224 in the DBMS 212 of the master node 120, for example.

The DBMS 212 of the master node 120 refers to the cache node management information 232, determines the cache node with the lowest CPU usage rate (Step 1802), changes the state of the determined cache node during the deletion, and waits for, when the cache node is executing processing, the completion of the processing that is being executed (Step 1804).

Next, the DBMS 212 of the master node 120 requests the cloud management unit 102 to delete an instance corresponding to the cache node to be deleted (Step 1806), and waits for the completion of the deletion of the cache node (Step 1808). When the DBMS 212 receives a response of the completion of the deletion from the cloud management unit 102, the DBMS 212 deletes the entry of the deleted cache node from the cache node management information 232 (Step 1810), and deletes the entry of the deleted cache node from the node information 500 (Step 1812). After the deletion, the DBMS 212 refers to the node information 500, determines a cache node belonging to the same group, and performs synchronization of the node information 500 for the DBMS 312 of the determined cache node (Step 1814).

Next, the DBMS 212 of the target master node (the master node that has deleted the cache node) refers to the node information 500, and determines whether a master node other than the target master node exists (Step 1816). When a master node other than the target master node exists, the target DBMS 212 of the master node performs synchronization of the node information 500 for the DBMS 212 of each master node other than the target master node (Step 1820). The DBMS 212 of the master node for which synchronization of the node information 500 has been performed refers to the node information 500 managed by the DBMS 212, determines a cache node belonging to the same group, and performs synchronization of the node information 500 for the DBMS 312 of the determined cache node (Step 1822).

Figure 19:
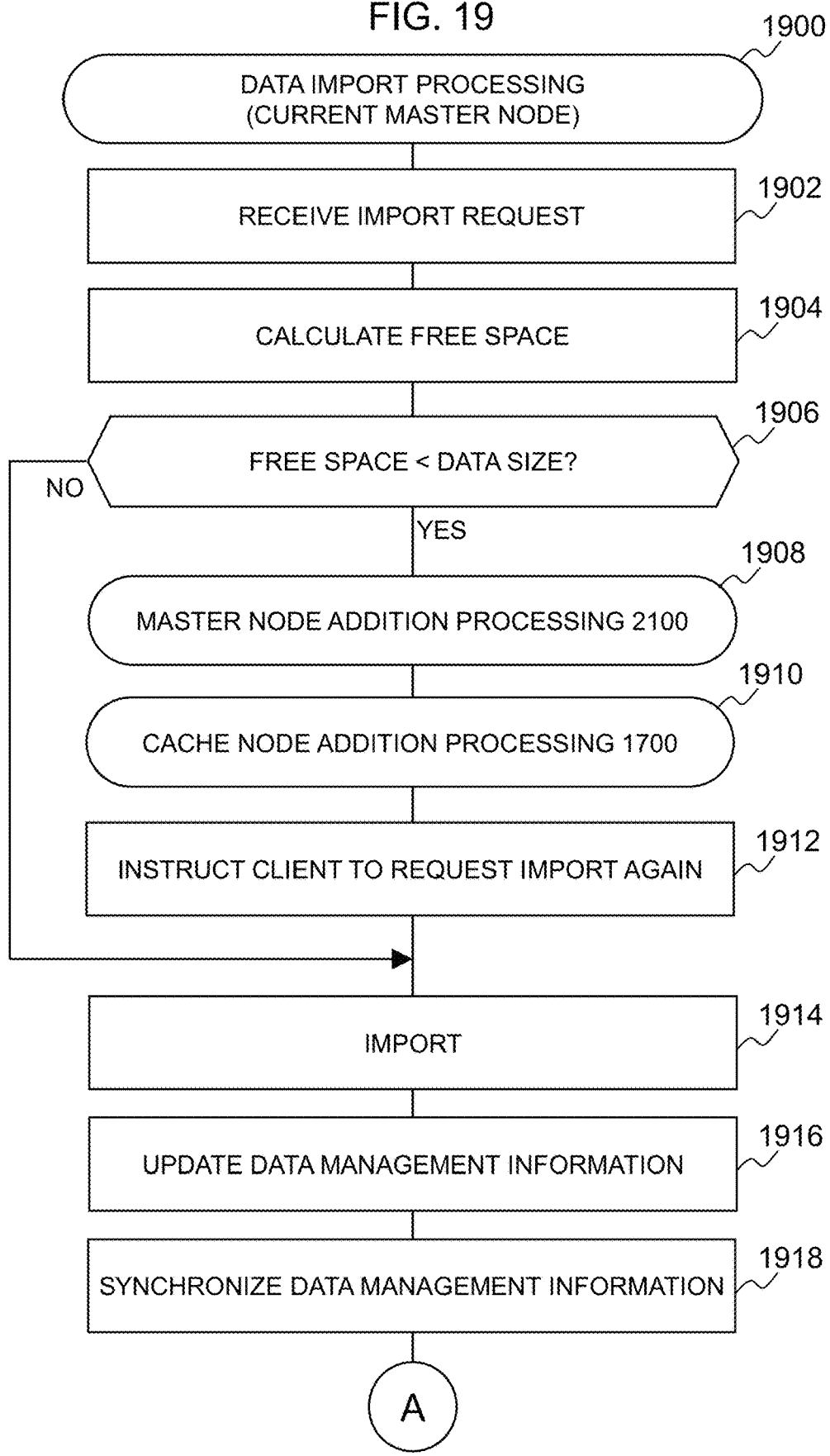
FIG. 19 is a flowchart showing one part of one example of data import processing.
Figure 20:
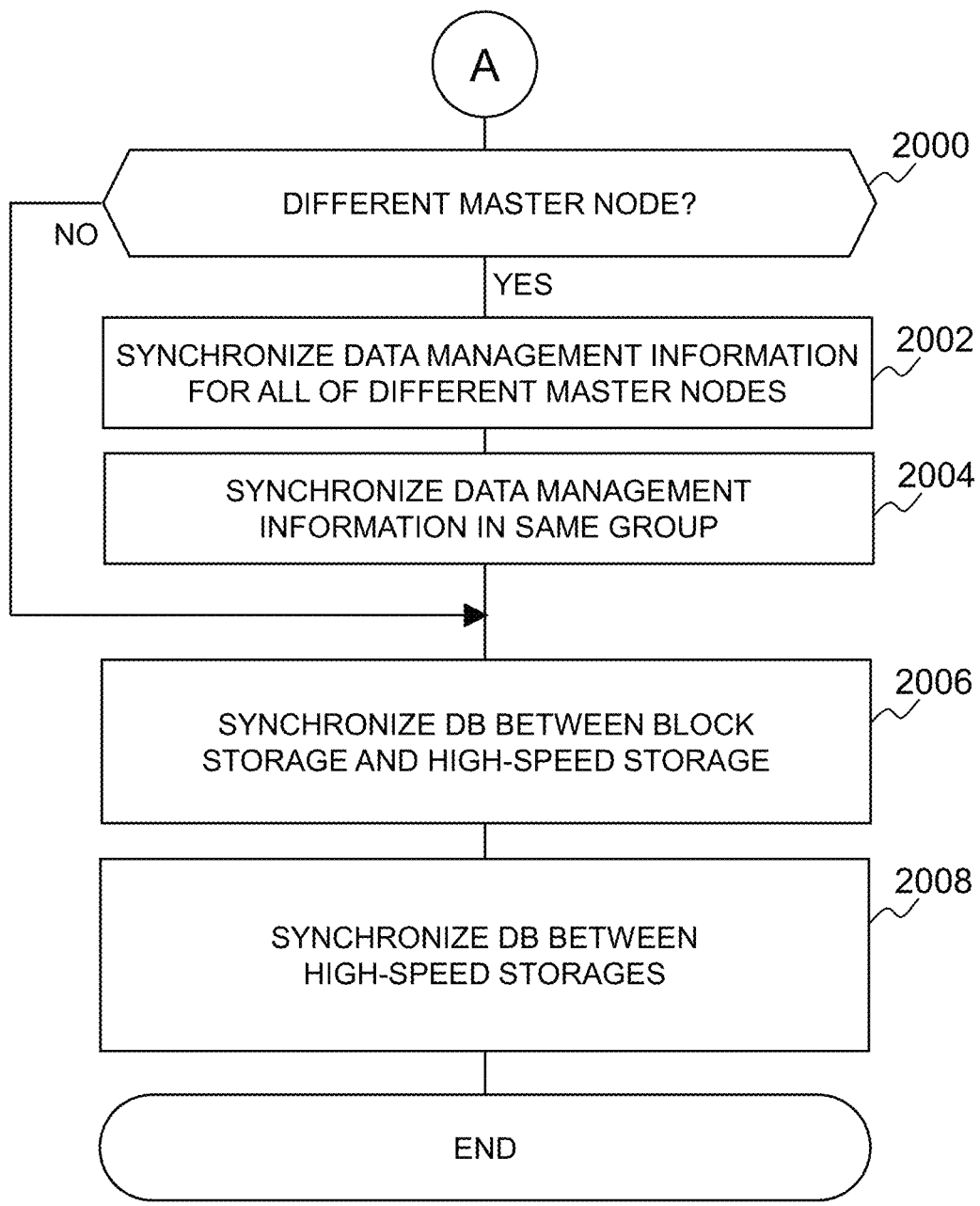
FIG. 20 is a flowchart showing the remainder of the one example of the data import processing.

FIG. 19 and FIG. 20 are flowcharts of data import processing 1900 executed by the DBMS 212 of the current master node.

The query acceptance unit 220 in the DBMS 212 of the current master node receives a request for data import (a request with which an import file in which data to be imported is stored is associated) from the application 106 (Step 1902). The query execution unit 222 of the DBMS 212 that has accepted the request for data import refers to the node information 500, calculates the data free space (for example, (data free space)=(data capacity)−(data usage amount)) of the master node (Step 1904), and determines whether the size of the data to be imported is larger than the calculated data free space (Step 1906).

When it is determined that the data free space of the master node is larger than (or the same as) the data to be imported, the query execution unit 222 of the DBMS 212 continues the processing from Step 1914. When it is determined that the data free space of the master node is smaller than the data to be imported, the DBMS 212 (for example, the node management unit 224) executes master node addition processing 2100 (Step 1908), executes the cache node addition processing 1700 (Step 1910), and generates a new group. After the generation of a new group, the generated master node becomes the current master node, and the DBMS 212 (for example, the query acceptance unit 320) of the master node that used to be the current node instructs the application 106 of the client 104 that is the import request source to request the import of the data again (Step 1912), and executes the processing from Step 1902.

The query execution unit 222 of the DBMS 212 of the current master node executes the import request, imports the data of the received import file into a database on the block storage 242 (Step 1914), and updates the data management information 230 in accordance with the imported data after the import of the data is completed (Step 1916). Next, the query execution unit 222 of the DBMS 212 refers to the node information 500, determines the cache node belonging to the same group, and performs synchronization of the data management information 230 for the DBMS 312 of the determined cache node (Step 1918).

Next, the query execution unit 222 of the DBMS 212 refers to the node information 500, and determines whether a master node other than the target master node (the master node including the DBMS 212) exists (Step 2000). When a master node other than the target master node exists, the query execution unit 222 of the DBMS 212 performs synchronization of the data management information 230 for the DBMS 212 of each master node other than the target master node (Step 2002). The DBMS 212 (for example, the query execution unit 322) of the master node for which synchronization of the data management information 230 has been performed refers to the node information 500, determines the cache node belonging to the same group, and performs synchronization of the data management information 230 for the DBMS 312 of the determined cache node (Step 2004).

The query execution unit 222 of the DBMS 212 of the target master node (the current master node that has executed the import of the data) performs synchronization between the data of the database of the high-speed storage 240 and the data of the database of the block storage 242 of the master node next (Step 2006). After the completion of the synchronization, the query execution unit 222 of the DBMS 212 refers to the node information 500, determines a cache node belonging to the same group, and performs synchronization between the data of the database of the high-speed storage 340 of the determined cache node and the data of the database of the high-speed storage 240 of the target master node (Step 2008).

Figure 21:
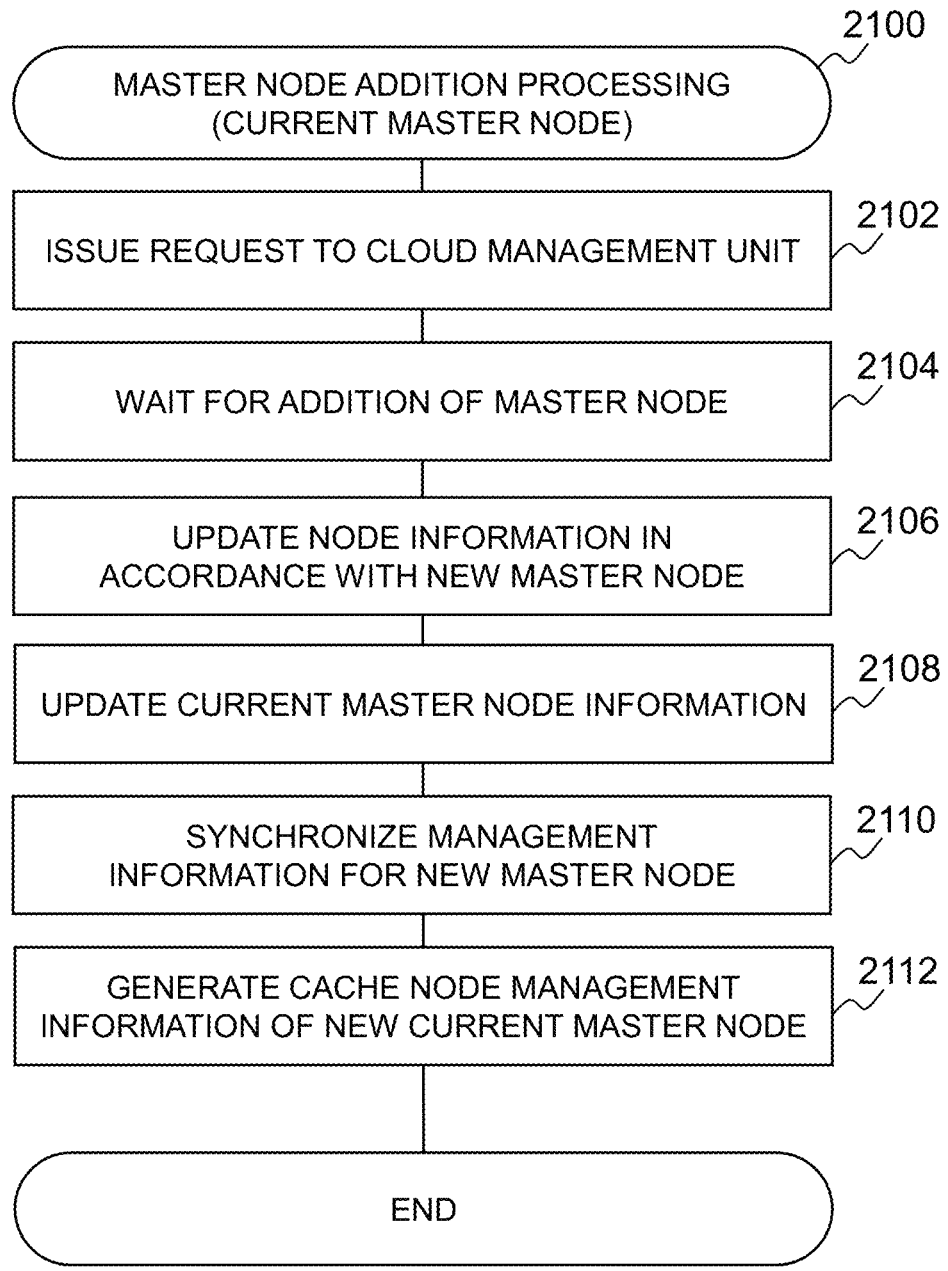
FIG. 21 is a flowchart showing one example of master node addition processing.
Figure 22:
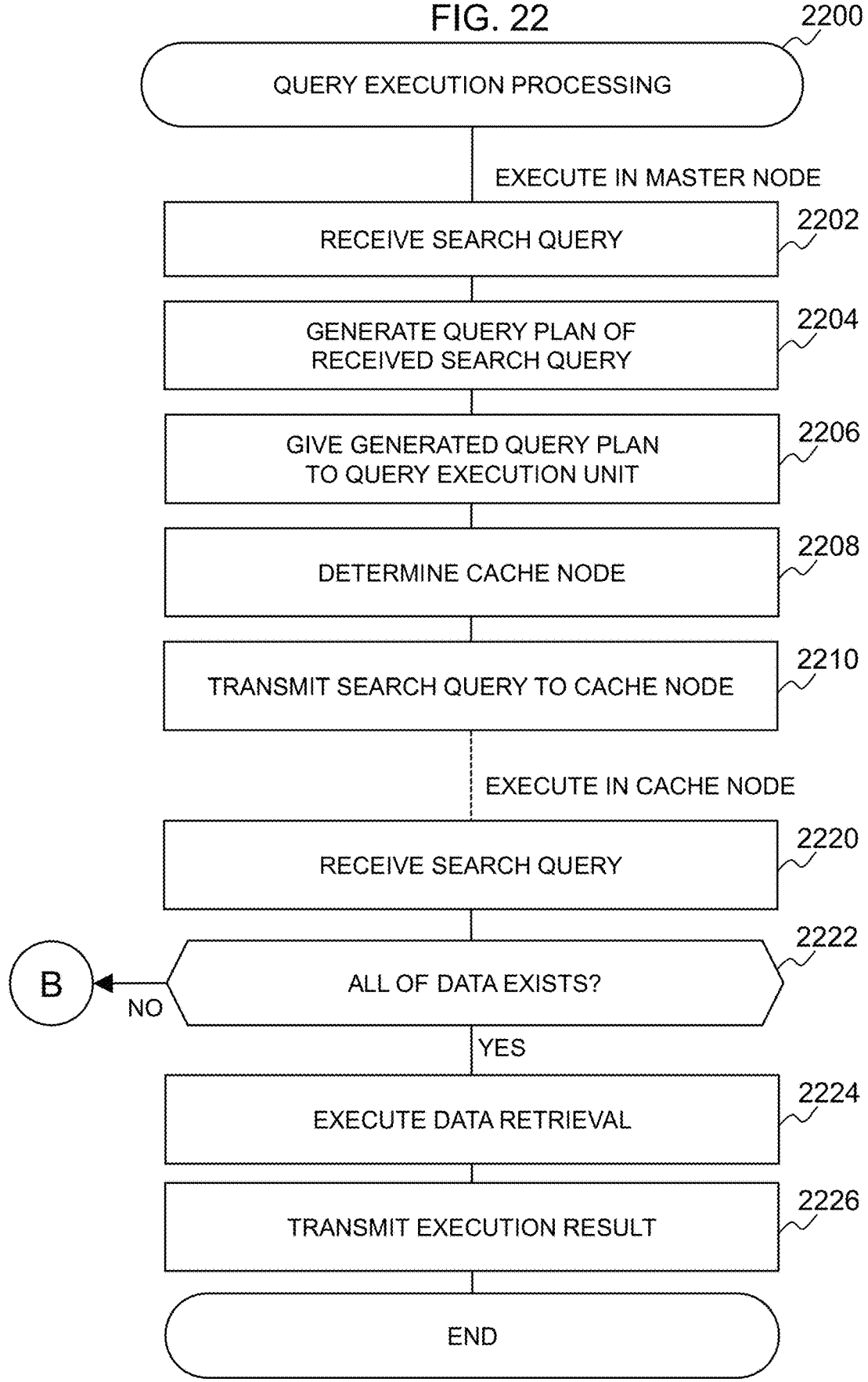
FIG. 22 is a flowchart showing one part of one example of query execution processing.
Figure 23A:
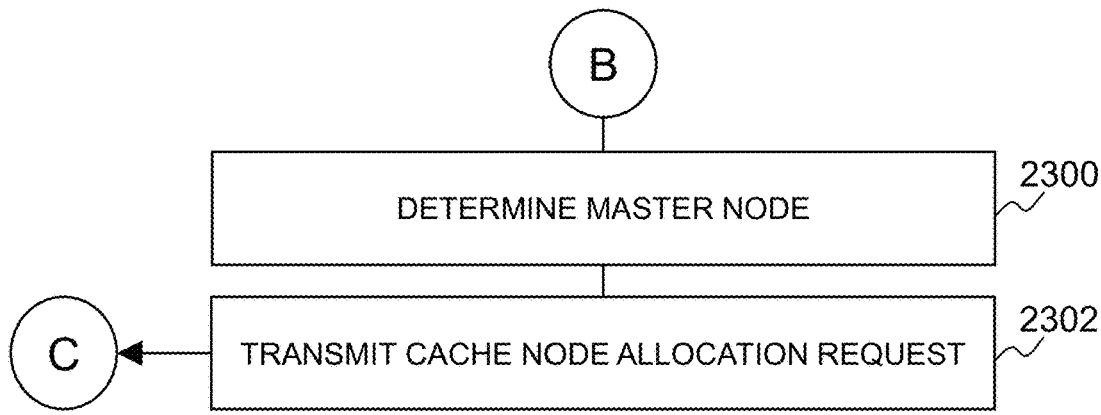
FIG. 23A is a flowchart showing one part of the one example of the query execution processing.
Figure 23B:
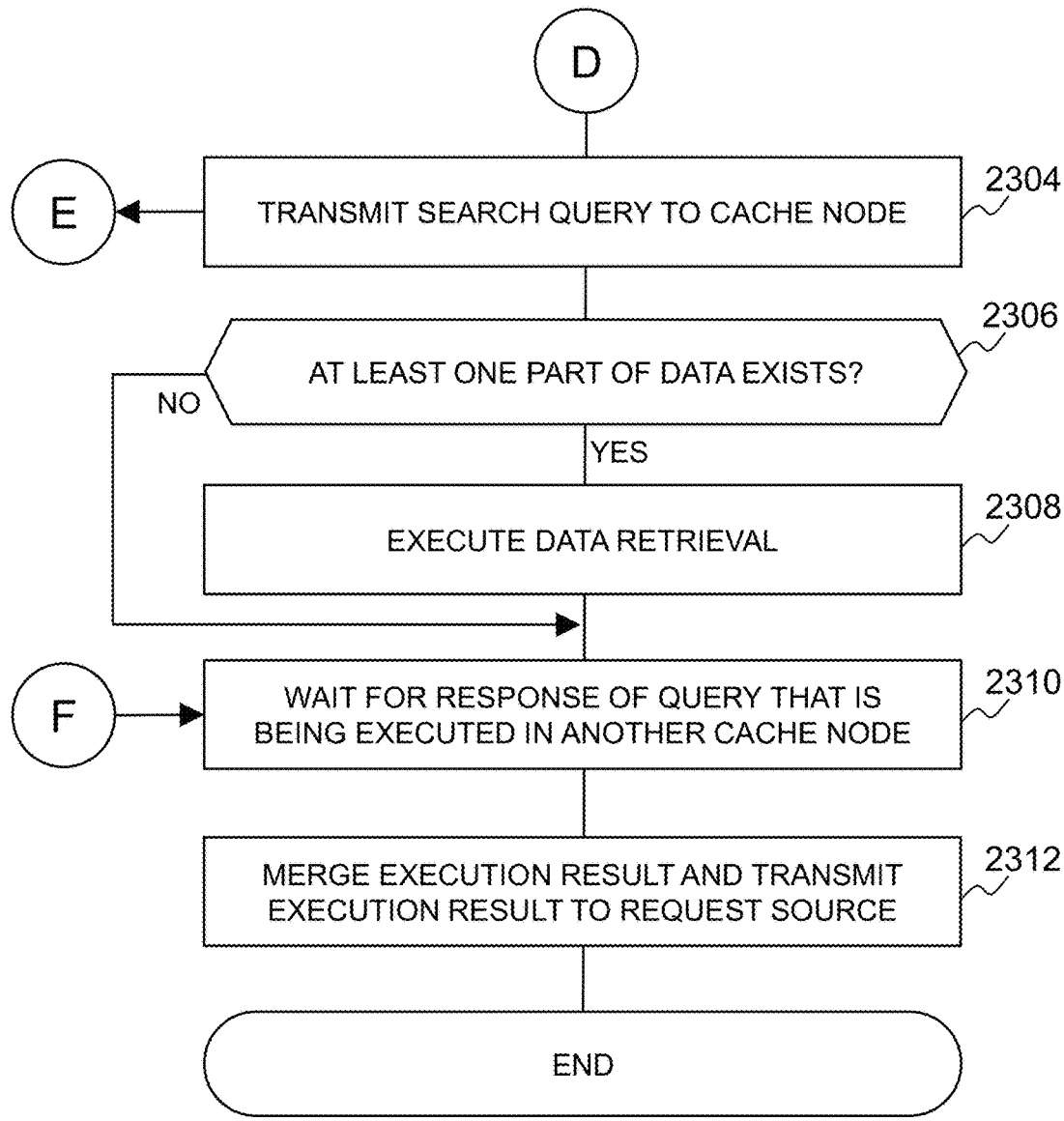
FIG. 23B is a flowchart showing one part of the one example of the query execution processing.
Figure 24A:
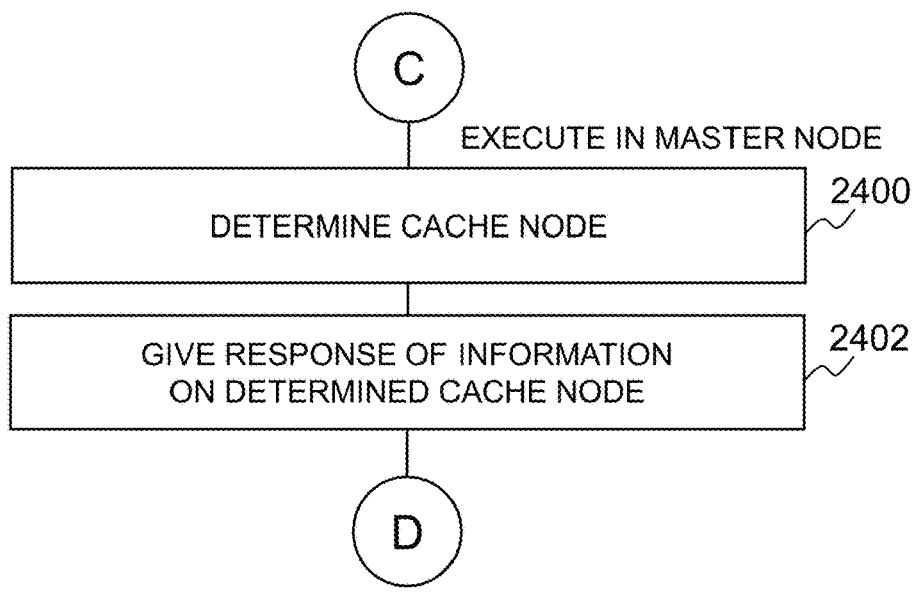
FIG. 24A is a flowchart showing one part of the one example of the query execution processing.
Figure 24B:
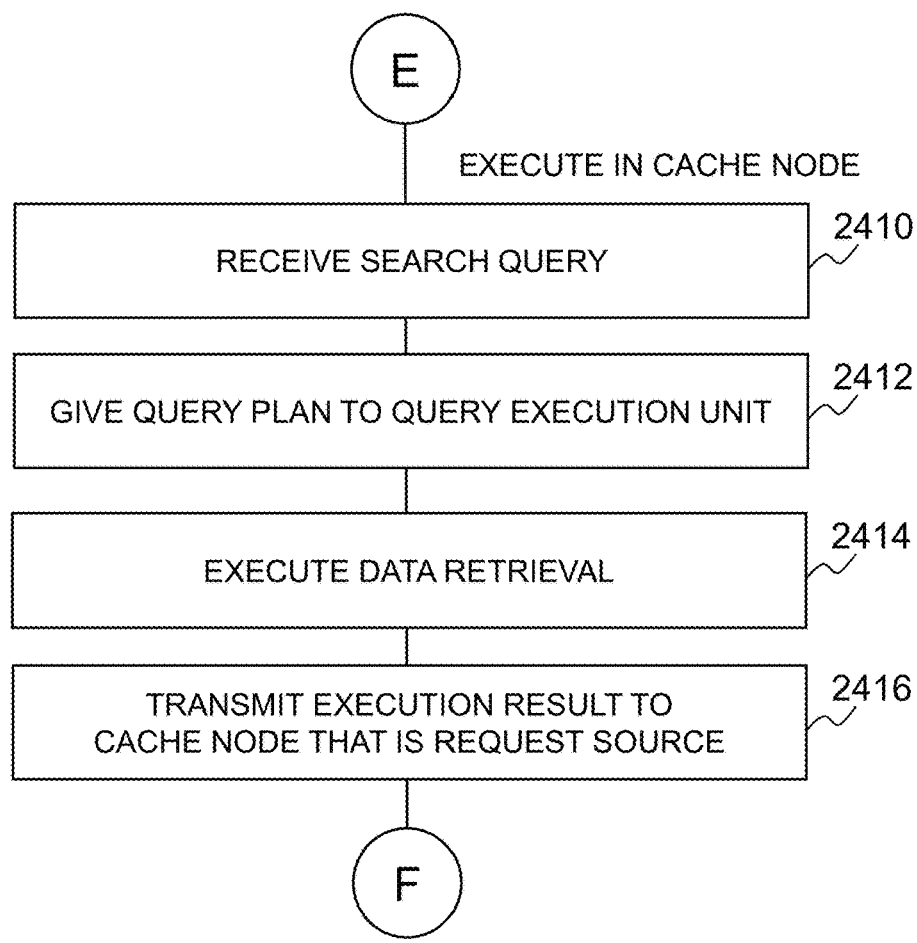
FIG. 24B is a flowchart showing the remainder of the one example of the query execution processing.

FIG. 21 is a flowchart of the master node addition processing 2100 executed by the DBMS 212 of the current master node. The master node addition processing 2100 may be performed by the node management unit 224 in the DBMS 212 of the master node 120, for example.

The DBMS 212 of the current master node refers to the instance configuration information 506, determines a master node configuration set in the field 550 of the instance configuration for the master node, and requests the cloud management unit 102 to generate an instance having the configuration (Step 2102). The cloud management unit 102 that has accepted the request for the generation of the instance generates an instance having the requested configuration and transmits information relating to the instance such as an IP address to the DBMS 212 that is the request source.

The DBMS 212 of the master node after the generation of a new instance request waits for a response from the cloud management unit 102 (Step 2104). When there is a response, the DBMS 212 registers information indicating the generated new instance (master node) in the node information 500 (Step 2106). Next, the DBMS 212 of the current master node changes the ID indicated by the current master node information 502 to the ID of the newly generated master node (Step 2108), and performs synchronization of the management information 75 (the DB management information 226, the node management information 228, and the data management information 230) for the DBMS 212 of the newly generated master node (Step 2110). The DBMS 212 of the master node that has newly become the current master node generates the cache node management information 232 (Step 2112).

FIG. 22, FIG. 23A, FIG. 23B, FIG. 24A and FIG. 24B are processing flowcharts of the query execution processing executed by the master node and the cache node. The query executed by the processing is a search query.

The query acceptance unit 220 in the DBMS 212 of the current master node receives a search query from the application 106 (Step 2202). Next, the query acceptance unit 220 of the DBMS 212 generates a query plan from the received search query (Step 2204), gives the generated query plan to the query execution unit 222 of the DBMS 212, and starts the query execution (Step 2206).

The query execution unit 222 of the DBMS 212 refers to the cache node management information 232, determines the cache node with the lowest CPU usage rate out of the cache nodes belonging to the same group (Step 2208), and transmits a search query with which the query plan and query source information (information relating to the client 104 and the application 106) are associated to the determined cache node (Step 2210).

The DBMS 312 of the cache node (C21 here) receives the search query with which the query plan and the query source information are associated from the DBMS 212 (Step 2220), refers to the data management information 230, and determines whether all of the data to be accessed in the execution of the search query exists in the database 350 of a node C31 (Step 2222).

When the determination result of Step 2222 is true, the query execution unit 322 of the DBMS 312 of the cache node C21 executes the data retrieval from the database on the high-speed storage 340 on the basis of the received query plan (Step 2224), and gives a response of the execution result to the application 106 that is the request source indicated by the query source information (Step 2226).

When the determination result of Step 2222 is false, the query execution unit 322 of the DBMS 312 of the cache node C21 refers to the data management information 230, determines the master node having the data to be accessed in the execution of the search query (Step 2300), and transmits a cache node allocation request to the determined master node (Step 2302). When a plurality of master nodes are determined in Step 2300, Step 2302 is performed for each of all of the determined master nodes.

The DBMS 212 (for example, the node management unit 224) of the master node that has received the cache node allocation request refers to the cache node management information 232, determines the cache node with the lowest CPU usage rate out of the cache nodes belonging to the same group (Step 2400), and gives a response of information on the determined cache node (C11 here) to the DBMS 312 of the cache node C21 that is the request source (Step 2402).

The DBMS 312 (for example, the query execution unit 322) of the cache node C21 that has received the response of the cache node allocation request transmits a search query with which a query plan is associated to the DBMS 312 of the allocated cache node C11 (Step 2304). Next, the DBMS 312 (for example, the query execution unit 322) of the cache node C21 refers to the data management information 230 managed by the DBMS 312, and determines whether at least one part of the data to be accessed in the execution of the search query exists in the database 350 of the own node C21 (Step 2306). When the determination result of Step 2306 is true, the query execution unit 322 of the DBMS 312 of the cache node C21 executes data retrieval from the database 350 in the high-speed storage 340 of the cache node C21 on the basis of the received query plan (Step 2308). After the completion of the execution or when the determination result of Step 2306 is false, the DBMS 312 (for example, the query execution unit 322) of the cache node C21 waits for a response of the search query executed in another cache node (Step 2310).

The query acceptance unit 320 of the DBMS 312 of the cache node C11 receives the request for query execution and a query plan from the DBMS 312 of the cache node C21 (Step 2410), and gives a query plan associated with the received search query to the query execution unit 322 (Step 2412). The query execution unit 322 executes data retrieval from the database 350 in the high-speed storage 340 of the cache node C11 on the basis of the received query plan (Step 2414). After the completion of the execution, the query execution unit 322 transmits the execution result to the DBMS 312 of the cache node C21 that is the request source (Step 2416).

The DBMS 312 of the cache node C21 waits for a response (execution result) from another cache node (C11 here) in Step 2310. After the reception of a response, the DBMS 312 merges a plurality of execution results when the query is executed in a plurality of cache nodes including the own node C21, and transmits the merged execution results to the application 106 of the client 104 that is the request source (Step 2312).

(9) Effects of this Embodiment

The database system according to this embodiment above includes the plurality of DBMSs (database management systems) included in the plurality of nodes provided in the cloud 100 (one example of the virtual environment based on the computer system including the plurality of computational resources). Each of the plurality of DBMSs is either the DBMS 212 (one example of the first DBMS) and the DBMS 312 (one example of the second DBMS). The DBMS 212 is a DBMS that transmits, when the DBMS 212 accepts a search query from the client 104 (one example of the query source), one or more search queries based on the search query and does not execute data retrieval. The DBMS 312 is a DBMS that executes data retrieval. The plurality of nodes configure the one or the plurality of groups 130. Each group 130 includes the master node 120 (one example of the first node) and one or more cache nodes 122 (one example of one or more second nodes). In each group 130, the master node 120 is a logical computer that provides the area of the block storage 242 (one example of the first storage area) and executes the DBMS 212. The cache node 122 is a logical computer that provides the area of the high-speed storage 340 (one example of the second storage area) and executes the DBMS 312. For each group 130, two or more DBMS included in two or more nodes configuring the group 130 store the same database in two or more storage areas provided by the two or more nodes, and data retrieval from the database in the group 130 is executed by one or more DBMSs 312 in the group 130. The master node 120 exists for each group 130, and the data retrieval is executed by the cache node 122. Therefore, the overconcentration of the processing can be avoided. The data retrieval can be performed for the database in the group 130 in which the data to be retrieved exists, and hence the data retrieval can be performed from data arranged in a distributed manner.

The cache node 122 may perform, in each group 130, scaling on the basis of the loading status of at least one cache node 122 belonging to the group 130. Meanwhile, the group 130 itself may perform scaling on the basis of the total amount of the database stored in all of the block storages 242. As a result, it is possible to flexibly respond to both of the change of the loading status and the increase in the data amount.

The area of the block storage 242 may be one example of the storage area based on the storage that secures the persistency of the data. Therefore, for example, even when the database 350 disappears from all of the cache nodes 122 in the same group, the database 350 can be restored with use of the database 250 managed by the master node 120 in the same group. The area of the high-speed storage 340 may be one example of the storage area based on the storage of which speed is higher than the speed of the block storage 242. The data retrieval is performed from the high-speed storage 240 by the cache node 122, and hence the improvement of the retrieval performance can be expected.

Each of the DBMSs may manage the data management information indicating the storage position of the data of the database. The predetermined DBMS 212 may accept the search query from the client 104. The predetermined DBMS 212 may transmit one or more search queries based on a search query to one or more DBMSs 312 in the same group 130 as the predetermined DBMS 212 when the predetermined DBMS 212 accepts the search query. The DBMS 312 that receives the search query from the predetermined DBMS 212 may perform data position determination for determining, on the basis of the data management information 230 managed by the DBMS 312, whether all of the data to be accessed on the basis of the search query exists in the database 350 in the cache node 122 that executes the DBMS 312. When the result of the data position determination is true, the DBMS 312 may execute data retrieval from the database 350. When the result of the data position determination is false, the DBMS 312 may transmit one or more search queries for data retrieval from the data to be accessed to one or more groups 130 in which at least one part of the data to be accessed exists. By the above, the data can be retrieved from one or more databases in one or more groups 130 regardless of which group 130 has the database in which the data to be retrieved exists. The DBMS 312 may transmit the search query to the master node 120 in another group 130, or may transmit the search query to the cache node 122 in another group 130 (in the former case, the search query may be transmitted to the cache node 122 from the master node 120 in the other group 130).

The predetermined DBMS 212 may be a DBMS in the current master node 120 that is the master node 120 in the newest group 130. When the current master node 120 receives a search query from the query source, the search query may be transmitted to the cache node 122 in the same group. In the newest group 130, the recent data is the imported group, and hence the possibility of the database of the newest group 130 being the target of retrieval is high. In this embodiment, the master node 120 in the newest group 130 is the current master node 120, and hence the high-speed data retrieval (for example, data retrieval in which the possibility of transmitting the search query to another group is low) is expected.

The DBMS 212 in the current master node 120 may accept the addition request of the data of the database. The group 130 may be newly added when the current DBMS 212 determines that the condition meaning that the free area of the area of the block storage 242 provided by the current master node 120 is insufficient is satisfied. In place of the current master node 120, the master node 120 in the newly added group 130 may newly become the current master node 120. By the above, the group 130 is added in accordance with the increase in the data amount managed by all of the master nodes 120 of the database system, and the master node 120 in the added newest group 130 becomes the current master node. As a result, it is expected that the scaling of the group 130 be performed in accordance with the data amount and the high-speed data retrieval be maintained. A predetermined DBMS 212 may update the data management information 230 managed by the predetermined DBMS 212 when data is added to the database in the newest group 130 in response to the addition request received by the predetermined DBMS 212. The data management information 230 after the update may be reflected in the data management information 230 managed by the DBMS in each node other than the current master node 120 in synchronization with the update. By the above, the data management information 230 indicating which data is in which master node (which group) can be maintained in the newest state in each node.

The query source information that is information indicating the query source may be associated with the search query from the predetermined DBMS 212 to at least one DBMS 312. When two or more DBMSs 312 perform data retrieval for the search query issued from the query source, one of the two or more DBMSs 312 may merge the results of the data retrieval performed by the two or more DBMSs 312 and return the merged results to the query source indicated by the query source information. As a result, the load concentration in the master node 120 can be avoided.

The predetermined DBMS 212 that receives the search query from the query source may generate the query plan of the search query, and transmit one or more search queries with which one or more query plans based on the generated query plan are associated to one or more DBMSs 312 in the same group 130 as the predetermined DBMS 212. The DBMS 312 that receives the search query may perform data retrieval in accordance with the query plan associated with the search query. As above, the data retrieval can be realized by deploying the query plan generated by the DBMS 212 of the current master node 120 in each of one or more groups including the same group.

When the result of the data position determination is false, the DBMS 312 that receives the search query from the predetermined DBMS 212 may inquire to the DBMS 212 in each of one or more groups 130 in which at least one part of the data to be accessed exists about the cache node 122 in the same group 130 as the DBMS 212. The DBMS 312 may receive the cache node information indicating one or more cache nodes 122 selected by the DBMS 212 that is the inquiry destination in response to the inquiry for each of the one or more groups 130. The DBMS 312 may transmit one or more search queries based on the search query received by the DBMS 312 to each of the one or more cache nodes 122 determined from the received cache node information for each of the one or more groups 130. As a result, the master node 120 of the group other than the newest group receives the search query from the cache node 122 in the newest group, and there is no need to transmit the search query to the cache node 122 in the same group as the master node 120. In other words, the load on the master node 120 in a group other than the newest group can be reduced.

The DBMS 212 of the master node 120 of each group 130 may monitor the operating status of the cache node belonging to the same group (own group). The DBMS 212 may select the cache node 122 of which operating status is low from the same group, and transmit the search query to the selected cache node 122. As a result, the load in the group 130 can be equalized.

Scaling of the cache nodes 122 is performed in accordance with the operating status (load) by utilizing the feature of the virtual environment such as the cloud 100 in which the addition or deletion of the instance are easy. For example, when the operating status becomes high, the influence on the data retrieval can be reduced by adding the cache node 122. When the operating status becomes low, power consumption needed for the operation of the cache node 122 (instance) can be reduced by deleting the cache node 122.

(10) Other Embodiments

In the above-mentioned embodiment, both of the block storage 242 and the high-speed storage 240 are described in the master node 120, but the high-speed storage 240 is not necessarily needed in the master node. In this case, synchronization between the data of the database in the block storage 242 and the data of the database in the high-speed storage 240 is not necessary, and the synchronization with the data of the database of the high-speed storage 240 of the cache node 122 is performed with the block storage 242.

Figure 25:
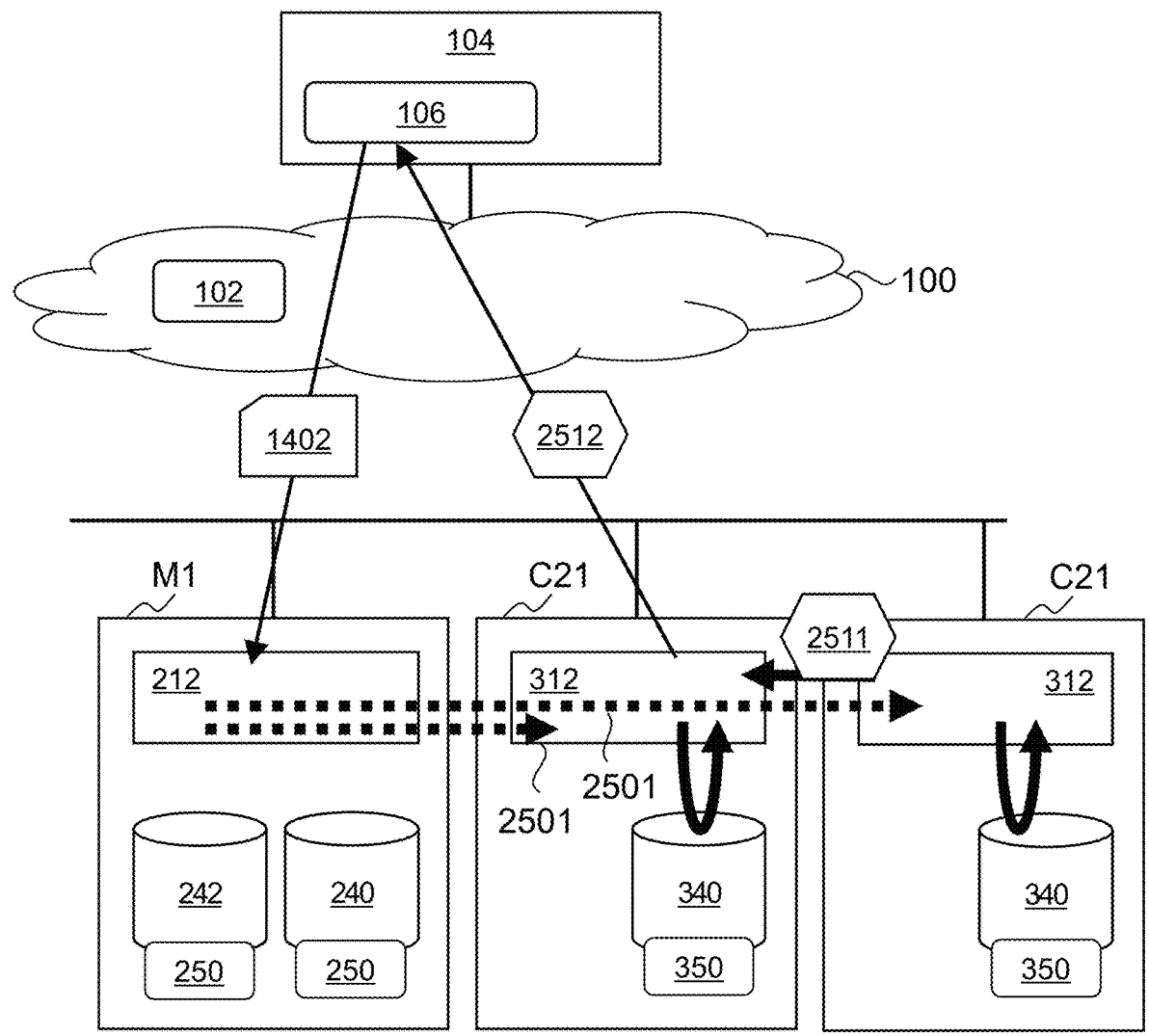
FIG. 25 is a diagram showing a processing example of search query execution in another embodiment.

The predetermined DBMS 212 may generate two or more search queries on the basis of the search query from the query source and transmit the two or more search queries to the two or more DBMSs 312 in the same group 130 as the predetermined DBMS 212. In other words, as exemplified in FIG. 25, the DBMS 212 of the master node 120 may select a plurality of the cache nodes 122 from the same group, and transmit a plurality of search queries obtained by dividing the search query from the query source to the selected plurality of cache nodes 122 (arrow 2501). In this case, one cache node 122 may be a main cache node and the rest of the cache nodes 122 may be sub-cache nodes in the plurality of cache nodes 122. For example, a sub-cache node C21 may execute a search query and transmit an execution result 2511 to a main cache node C21. The main cache node C21 may give a response of an execution result 2512 obtained by merging the execution result 2511 and the execution result in the node C21 to the application 106 that is one example of the query source. As above, by executing the data retrieval in a divided manner by the plurality of cache nodes 122, a period of time from when the search query from the query source is received to when the query source is responded to can be shortened.

When the DBMS 212 of the current master node 120 receives the search query from the application 106 of the client 104, the DBMS 212 generates a query plan. However, instead of the above, the DBMS 312 that has received the search query may generate a query plan of the search query and perform data retrieval in accordance with the generated query plan in FIG. 14, for example. As a result, the load necessary for the processing of generating the query plan is reduced from the master node, and hence overconcentration in the master node can be avoided.

Figure 26:
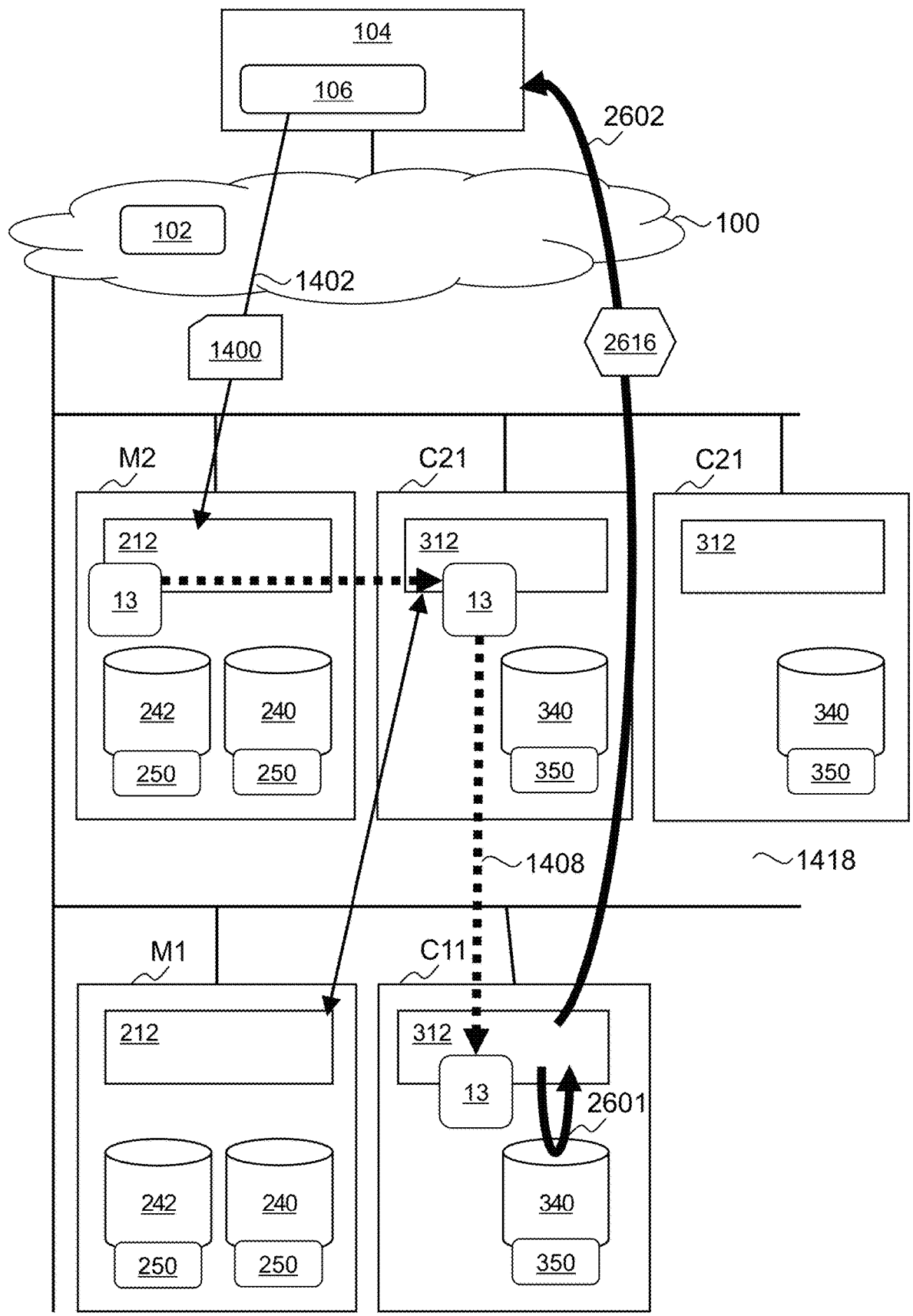
FIG. 26 is a diagram showing a processing example of search query execution in another embodiment.

As exemplified by FIG. 26, when the DBMS 312 of the cache node 122 that has received a search query determines that none of the data to be accessed in accordance with the search query exists in the database included in the own node 122 with use of the data management information 230, the DBMS 312 may transmit the search query to a cache node having the data to be accessed via or not via a master node in a group including the cache node, and the cache node that has received the search query may execute the search query and transmit a response including the execution result to the query source that is the request source. As a result, the processing load on the cache nodes that are not related to the query execution can be reduced.

A number of embodiments have been described above, but those embodiments are examples for describing the present invention, and it is not intended to limit the scope of the present invention to those embodiments.

For example, the present invention can be applied to general data processing systems including the database system. For example, a data processing system according to one embodiment of the present invention can be expressed as follows.

In other words, the data processing system includes a plurality of data processing units included in a plurality of nodes provided in a virtual environment based on a computer system including a plurality of computational resources. Each of the plurality of data processing units is either a first data processing unit or a second data processing unit. The first data processing unit is a data processing unit that transmits, when the first data processing unit accepts a read request from a request source, one or more read requests based on the read request but does not execute read processing for reading data to be read from a storage area. The second data processing unit is data processing unit that executes the read processing. The plurality of nodes configure one or a plurality of node groups. Each node group includes a first node and one or more second nodes. In each node group, the first node is a logical computer that provides a first storage area and includes a first data processing unit. The second node is a logical computer that provides a second storage area and includes a second data processing unit. For each node group, two or more of the data processing units included in two or more of the nodes configuring the node group store the same data in two or more storage areas provided by the two or more nodes. For each node group, read processing from the data in the node group is executed by one or more second data processing units in the node group. When the data processing unit receives a request, the data processing unit executes processing in accordance with the request and/or transmits one or more requests based on the request. One example of the data processing unit is the DBMS. One example of the read request is the search query.

We claim:

1. A database system, comprising a plurality of DBMSs (Database Management Systems) included in a plurality of nodes provided in a virtual environment based on a computer system including a plurality of computational resources, wherein:
    each of the plurality of DBMSs is either a first DBMS or a second DBMS;
    the first DBMS is a DBMS that transmits, when the first DBMS accepts a search query, one or more search queries based on the search query, and does not execute data retrieval;
    the second DBMS is a DBMS that executes data retrieval;
    the plurality of nodes configure one or a plurality of node groups;
    each of the one or the plurality of node groups includes a first node and one or more second nodes;
    in each node group:
        the first node is a logical computer that provides a first storage area and executes the first DBMS;
        the second node is a logical computer that provides a second storage area and executes the second DBMS;
        two or more of the DBMSs included in two or more of the nodes configuring the node group store a same database in two or more storage areas provided by the two or more nodes; and
        data retrieval from the database in the node group is executed by one or more of the second DBMSs in the node group;
    each of the DBMSs manages data management information indicating a storage position of data in the database;
    a predetermined first DBMS accepts a search query from a query source;
    the predetermined first DBMS transmits one or more search queries based on a search query to the one or more second DBMSs in a same node group as the predetermined first DBMS when the predetermined first DBMS accepts the search query; and
    the second DBMS that receives the search query from the predetermined first DBMS:
        performs data position determination for determining, on basis of data management information managed by the second DBMS, whether all of data to be accessed on basis of the search query exists in a database in the second storage area provided by the second node that executes the second DBMS;
        executes data retrieval from the database in the second storage area provided by the second node that executes the second DBMS when a result of the data position determination is true; and
        transmits one or more search queries for data retrieval from the data to be accessed to one or more node groups in which at least one part of the data to be accessed exists when the result of the data position determination is false.

2. The database system according to claim 1, wherein:
    the second node performs, in each node group, scaling on basis of a loading status of at least one of the second nodes belonging to the node group; and
    the node group performs scaling on basis of a total amount of the database stored in all of the first storage areas.

3. The database system according to claim 1, wherein:
    the first storage area is a storage area based on a storage apparatus that secures a persistency of data; and
    the second storage area is a storage area based on a storage apparatus of which speed is higher than a speed of the storage apparatus on which the first storage area is based.

4. The database system according to claim 1, wherein the predetermined first DBMS is a DBMS in a current first node that is the first node in a newest node group.

5. The database system according to claim 4, wherein:
    the predetermined first DBMS accepts an addition request of the data of the database; and
    a node group is newly added when the predetermined first DBMS determines that a condition meaning that a free area of the first storage area provided by the current first node is insufficient is satisfied, and, in place of the current first node, the first node in the newly added node group newly becomes the current first node.

6. The database system according to claim 5, wherein the predetermined first DBMS updates data management information managed by the predetermined first DBMS when data is added to a database of the newest node group in response to the addition request received by the predetermined first DBMS, and the data management information after the update is reflected in data management information managed by the DBMS in each node other than the current first node in synchronization with the update.

7. The database system according to claim 1, wherein:
    query source information that is information indicating the query source is associated with the search query from the predetermined first DBMS to at least one second DBMS; and
    one of two or more of the second DBMSs merges, when the two or more second DBMSs perform data retrieval for the search query issued from the query source, results of the data retrieval performed by the two or more second DBMSs and returns the results to the query source indicated by the query source information.

8. The database system according to claim 1, wherein:
    the predetermined first DBMS that has received the search query from the query source generates a query plan of the search query, and transmits one or more search queries with which one or more query plans based on the generated query plan are associated to the one or more second DBMSs in the same node group as the predetermined first DBMS; and
    the second DBMS that has received the search query performs data retrieval in accordance with the query plan associated with the search query.

9. The database system according to claim 1, wherein the second DBMS that receives the search query generates a query plan of the search query, and performs data retrieval in accordance with the generated query plan.

10. The database system according to claim 1, wherein the predetermined first DBMS generates two or more search queries on basis of the search query from the query source, and transmits the two or more search queries to two or more second DBMS in the same node group as the predetermined first DBMS.

11. The database system according to claim 1, wherein, when not all of the data to be accessed in accordance with the search query received by the second DBMS in the same node group from the predetermined first DBMS exists in the database in the second storage area provided by the second node that executes the second DBMS, the second DBMS in another node group that receives the search query from the second DBMS gives a response of an execution result of the search query to the query source.

12. The database system according to claim 1, wherein, when the result of the data position determination is false, the second DBMS that receives the search query from the predetermined first DBMS:
   inquires to the first DBMS in each of one or more node groups in which at least one part of the data to be accessed exists about the second node in a same node group as the first DBMS;
   receives second node information indicating one or more second nodes selected by the first DBMS that is an inquiry destination in response to the inquiry for each of the one or more node groups; and
   transmits one or more search queries based on the search query received by the second DBMS to each of the one or more second nodes determined from the received second node information for each of the one or more node groups.

13. A query execution method, comprising:
   building one or a plurality of node groups in a virtual environment based on a computer system including a plurality of computational resources, the node groups each including a first node and one or more second nodes, the first node being a logical computer that provides a first storage area and executes a first DBMS, the second node being a logical computer that provides a second storage area and executes a second DBMS;
   storing a same database in two or more storage areas provided by two or more nodes in the built node group;
   accepting, by the first DBMS, a search query from a query source;
   transmitting, by the first DBMS, one or more search queries based on the search query to the one or more second DBMSs;
   executing, for each node group, when a database in the node group is a target of retrieval, data retrieval from the database by the one or more second DBMSs in the node group;
   managing, by each of the DBMSs, data management information indicating a storage position of data in the database;
   accepting, by a predetermined first DBMS, a search query from a query source;
   transmitting, by the predetermined first DBMS, one or more search queries based on a search query to the one or more second DBMSs in a same node group as the predetermined first DBMS when the predetermined first DBMS accepts the search query; and
   by the second DBMS that receives the search query from the predetermined first DBMS:
      performing data position determination for determining, on basis of data management information managed by the second DBMS, whether all of data to be accessed on basis of the search query exists in a database in the second storage area provided by the second node that executes the second DBMS;
      executing data retrieval from the database in the second storage area provided by the second node that executes the second DBMS when a result of the data position determination is true; and
      transmitting one or more search queries for data retrieval from the data to be accessed to one or more node groups in which at least one part of the data to be accessed exists when the result of the data position determination is false.

* * * * *